(12) United States Patent
Kawasaki et al.

(10) Patent No.: US 7,340,248 B2
(45) Date of Patent: Mar. 4, 2008

(54) CALIBRATION APPARATUS

(75) Inventors: Toshio Kawasaki, Kawasaki (JP);
Chiyoshi Akiyama, Kawasaki (JP);
Tomonori Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 133 days.

(21) Appl. No.: 11/188,379

(22) Filed: Jul. 25, 2005

(65) Prior Publication Data

US 2006/0234694 A1    Oct. 19, 2006

(30) Foreign Application Priority Data

Mar. 30, 2005  (JP) ............................. 2005-097380

(51) Int. Cl.
*H04Q 7/20* (2006.01)

(52) U.S. Cl. ................ 455/423; 455/67.11; 455/115.1; 455/226.1; 455/67.14; 455/115.2; 455/226.2; 342/368

(58) Field of Classification Search ........ 455/423–425, 455/562.1–2, 67.11, 67.14, 115.1, 115.2, 455/226.1, 226.2; 342/368, 174
See application file for complete search history.

(56) References Cited

U.S. PATENT DOCUMENTS

| | | | |
|---|---|---|---|
| 4,949,090 A | | 8/1990 | Tamii et al. |
| 5,530,449 A | * | 6/1996 | Wachs et al. ................ 342/174 |
| 6,339,399 B1 | * | 1/2002 | Andersson et al. ......... 342/372 |
| 6,594,509 B1 | * | 7/2003 | Takakusaki et al. ..... 455/562.1 |
| 6,690,952 B2 | * | 2/2004 | Nishimori et al. ....... 455/562.1 |
| 6,762,717 B2 | * | 7/2004 | Hirabe ....................... 342/368 |
| 6,917,786 B1 | * | 7/2005 | Mizuguchi ............... 455/67.14 |
| 6,934,541 B2 | * | 8/2005 | Miyatani .................... 455/423 |
| 6,963,742 B2 | * | 11/2005 | Boros et al. ................ 455/424 |
| 6,987,989 B2 | * | 1/2006 | Hiramatsu et al. ....... 455/562.1 |
| 7,058,418 B2 | * | 6/2006 | Doi et al. ................... 455/500 |
| 7,062,294 B1 | * | 6/2006 | Rogard et al. ........... 455/562.1 |
| 2003/0058166 A1 | * | 3/2003 | Hirabe ....................... 342/368 |

FOREIGN PATENT DOCUMENTS

| | | |
|---|---|---|
| EP | 1 014 485 | 6/2000 |
| EP | 1 235 361 | 8/2002 |
| EP | 1 294 047 | 3/2003 |
| EP | 1 329 983 | 7/2003 |
| JP | 2003-218621 | 7/2003 |
| WO | WO 03/043129 | 5/2003 |

OTHER PUBLICATIONS

European Search Report dated Oct. 24, 2006.
Partial European Search Report dated Jul. 28, 2006.

* cited by examiner

*Primary Examiner*—Sharad Rampuria
(74) *Attorney, Agent, or Firm*—Katten Muchin Rosenman LLP

(57) ABSTRACT

In a calibration apparatus, which calibrates the phases of main signals input to each of the antenna elements of an array antenna, a calibration signal generation portion generates calibration signals, which are combined with main signals. An RF switch alternately inputs to a wireless receiving portion the signals radiated from other antenna elements via a first antenna element, and the signals radiated from other antenna elements via a second antenna element, and causes demodulation. The calibration detection portion detects calibration signals from the demodulated signals, and the weight generation portion uses the detected calibration signals to calculate calibration weights, which are set in the phase shifter, to control the phases of main signals for input to each antenna element.

2 Claims, 14 Drawing Sheets

CALIBRATION APPARATUS

BACKGROUND OF THE INVENTION

This invention relates to a calibration apparatus, and in particular to a calibration apparatus which makes equal the phases at the antenna elements of an array antenna.

Digital cellular wireless communications systems using DS-CDMA technology are being developed as next-generation mobile communication systems. CDMA methods allocate channels based on codes to perform communication simultaneously; due to interference from the signals of other channels through which there is simultaneous communication, the number of channels through which simultaneous communication is possible, that is, the channel capacity, is limited. Techniques to suppress interference are effective for increasing the channel capacity.

An adaptive array antenna adaptively forms a beam for a desired user according to the environment, and forms a null point for a user which is a large interference source, enabling increases in channel capacity. That is, a beam is formed in the direction of a designated user, and a null point is directed toward a user who is a large interference source, so that radio waves can be received with good sensitivity from the designated user, without receiving radio waves from the large interference source. By this means, the amount of interference can be reduced, and consequently the channel capacity can be increased.

An adaptive antenna uses phase differences at the antenna elements to generate a beam. Hence if phase fluctuations in the wireless portions of the antennas each differ, a beam pattern cannot be controlled correctly. Therefore, in order to correctly control the beam pattern, phase differences at antenna elements arising from different phase fluctuations must be corrected. Means for correcting such phase differences multiplexes a calibration signal, and detects phase differences in the multiplexed signal (see for example Japanese Patent Laid-open No. 2003-218621).

FIG. 14 is a diagram of the configuration of a transmitter comprising a conventional calibration function as described in the above-mentioned patent reference, which makes equal the phase characteristic and amplitude characteristic of signals radiated from antenna elements 1-1 to 1-6 comprised by a linear array antenna. To this end, the transmitter comprises a calibration signal generator 4 which generates calibration signals, an adder 5 to add calibration signals to user multiplexed signals (main signals), a circulator 6 which retrieves signals electromagnetically combined from adjacent antenna elements, a receiver 7 which receives the retrieved signals from the circulator 6, an RF switch 8 which switches the input signals of the receiver 7, a calibration coefficient calculation portion 9 which detects calibration signals from the output of the receiver 7 and calculates calibration coefficients, a multiplier 10 which multiplies calibration coefficients calculated by the calibration coefficient calculation portion 9 and the main signal, a power combiner 11 which combines signals electromagnetically coupled from the antenna elements 1-2, 1-5 adjacent to the antenna elements 1-1, 1-6 on the two ends of the linear array antenna, a user signal multiplexing portion 12 which multiplexes a plurality of user signals, and a beam former 13 which forms a transmission beam pattern by independently controlling the phases and amplitudes of signals input to each of the array antenna elements 1-1 to 1-6 such that the peak is directed in the direction in which the user (mobile station) exists; the calibration signals C1 to C6 generated by the calibration signal generator 4 are orthogonal signals with no correlation, and enable independent retrieval of each calibration signal by the receiver 7.

Calibration signals C1, C3 transmitted from the antenna elements 1-1 and 1-3 are received by the antenna element 1-2 through the electromagnetic coupler between the antenna elements. The received signals C1, C3 are retrieved by the circulator 6 and input to the P1 port of the RF switch 8. Similarly, C2 and C4 are input to the P2 port, C3 and C5 are input to the P3 port, C4 and C6 are input to the P4 port, and C2 and C5 are input to the P5 port.

The RF switch 8 is switched in order, and the signals input to the ports P1 to P5 are demodulated by the receiver 7 and converted to baseband signals; the calibration coefficient calculation portion 9 measures the phases of each of the calibration signals C1 to C6, and determines the calibration coefficients needed to make equal the phases of all of the signals C1 to C6. C1 to C6 are input to the transmitter 3 with the same phase, and so the measures phases of the signals C1 to C6 indicate the scattering in the phase characteristics of the transmitter 3, the antenna elements 1, and cables. Hence by using the multiplier portion 10 to multiply the calibration coefficients calculated from the measured values with the input signals, the phase characteristics can be made equal for each of the transmission systems.

In the technology of the prior art, all the antenna elements must electromagnetically receive calibration signals radiated from adjacent antenna elements. Consequently in the prior art, a configuration is employed in which an RF switch is used to switch the antenna elements and input signals to the wireless reception portion. However, if the number of antenna elements is N, then the RF switch must be able to switch (N−1) signals. The greater the number of signals switched, the more expensive is the RF switch, and so there has been the problem that configurations of the prior art require an expensive RF switch.

SUMMARY OF THE INVENTION

An object of this invention is to provide a calibration apparatus configured such that there is a small number of signals to be switched by an RF switch, or such that an RF switch is not used.

A further object of this invention is to provide a calibration apparatus configured such that, for both uplinks and downlinks, there is a small number of signals to be switched by an RF switch, or such that an RF switch is not used.

A first calibration apparatus of this invention calibrates the phases of the main signals input to each of the antenna elements of an array antenna, and comprises a calibration signal generation portion, which generates calibration signals; a signal combining portion, which combines the calibration signals with the main signals input to each of the antenna elements; an RF switch, to which signals radiated from other antenna elements through the first antenna element are input, to which signals radiated from other antenna elements through the second antenna element are input, and which switches and outputs each of the input signals; a receiving portion, which demodulates signals switched by the RF switch; a calibration signal detection portion, which detects calibration signals from demodulation signals; a weight generation portion, which calculates the calibration weight to control the phases of the main signals input to each of the antenna elements using the calibration signal detected for each antenna element; and a phase shifter, which controls phase-shifting of the main signals input to the antenna elements based on the calculated calibration weights. The weight generation portion can accurately control as desired the phases of the main signals input to each of the antenna elements from the beamformer during transmission, by calculating the calibration weights such that the phases of calibration signals received from each of the antenna elements are phases which are conformity to antenna element intervals.

A second calibration apparatus of this invention comprises first and second transmission portions which transmit the same signals, and calibrates the phases of each of the main signals input to each of the antenna elements of the array antennas of the first and second transmission portions. The calibration apparatus comprises a calibration signal generation portion, which generates calibration signals; a signal combining portion, which combines the main signals input to each of the antenna elements of the first and second transmission portions with the calibration signals; an RF switch, to which signals radiated from all the antenna elements of the second transmission portion via one antenna element of the first transmission portion are input, to which signals radiated from all the antenna elements of the first transmission portion via one antenna element of the second transmission portion are input, and which switches and outputs the input signals; a receiving portion, which demodulates the signals switched by the RF switch; a calibration signal detection portion, which detects calibration signals from demodulated signals; a weight generation portion, which uses the calibration signals detected for each of the antenna elements to calculate, for each antenna element, calibration weights to control the phases of the main signals input to each antenna element of the first transmission portion and the phases of the main signals input to each antenna element of the second transmission portion; and a phase shifter, which executes phase-shifting control of the main signals input to each of the antenna elements of the first and second transmission portions, based on the calculated calibration weights. The weight generation portion can correctly control as desired the phases of the main signals input to each of the antenna elements from the beamformer at the time of transmission, by calculating the calibration weights such that the phases of calibration signals received from the antenna elements are the phases which are conformity to the antenna element intervals.

A third calibration apparatus of the invention is a calibration apparatus which calibrates the phases of main signals input to each of the antenna elements of an array antenna, and comprises a calibration signal generation portion, which generates calibration signals; a signal combining portion, which combines the calibration signals with the main signals input to the antenna elements; a first receiving portion, which takes as input and demodulates the signals radiated from other antenna elements through the first antenna element; a second receiving portion, which takes as input and demodulates the signals radiated from other antenna elements through the second antenna element; a calibration signal detection portion, which detects calibration signals from demodulated signals demodulated by the first and second receiving portions; a weight generation portion, which uses the detected calibration signals output from each of the antenna elements to calculate the calibration weight to control the phases of the main signals input to each of the antenna elements; and a phase shifter, which controls phase-shifting of the main signals input to the antenna elements based on the calculated calibration weights. The weight generation portion can accurately control as desired the phases of main signals input to each of the antenna elements from the beamformer during transmission, by calculating the calibration weights such that the phases of calibration signals received from each of the antenna elements are phases which are conformity to antenna element intervals.

A fourth calibration apparatus of the invention is a calibration apparatus which calibrates the phases of main signals received by each of the antenna elements of an array antenna, and comprises a calibration signal generation portion, which generates calibration signals; a wireless transmission portion, which transmits calibration signals by wireless means; an RF switch, which switches, and inputs to first and second antenna elements, the calibration signals output from the wireless transmission means; a wireless receiving portion, to which are input signals received by antenna elements; a calibration signal detection portion, which detects calibration signals from the wireless receiving means; a weight generation portion, which uses the detected calibration signals to calculate calibration weights to control the phases of the main signals received by antenna elements; and a phase shifter, which executes phase-shifting of signals received by the antenna elements, based on the calculated calibration weights. The weight generation portion makes equal the phases of main signals input to the beamformer from the antenna elements at the time of reception, by calculating calibration weights such that the phases of calibration signals received at the antenna elements are phases which are conformity to antenna element intervals.

A fifth calibration apparatus of the invention is a calibration apparatus which calibrates the phases of main signals received by each antenna element of an array antenna, and comprises a calibration signal generation portion, which generates calibration signals; a first wireless transmission portion, which transmits calibration signals from a first antenna; a second wireless transmission portion, which transmits calibration signals from a second antenna; a wireless receiving portion, to which are input the signals received by each antenna element; a calibration signal detection portion, which detects calibration signals from the received signals of each wireless receiving portion; a weight generation portion, which uses detected calibration signals to calculate calibration weights to control the phases of the main signals received by each antenna element; and a phase shifter, which executes phase-shifting control of the main signals received by each of the antenna elements, based on the calculated calibration weights. The weight generation portion can make equal the phases of main signals input to the beamformer from the antenna elements at the time of reception, by calculating calibration weights such that the phases of calibration signals received at the antenna elements are phases which are conformity to antenna element intervals.

By means of this invention, the number of signals switched by the RF switch can be decreased to two, regardless of the number of antenna elements in the array antenna at the time of transmission, so that the cost of the RF switch can be reduced. Further, the number of signals switched by the RF switch can be decreased to two, regardless of the number of antenna elements in the array antenna at the time of reception, so that the cost of the RF switch can be reduced.

By means of this invention, a calibration apparatus which does not use an expensive RF switch can be provided.

By means of this invention, even in a wireless apparatus with a transmission diversity configuration or with a reception diversity configuration, the number of signals switched by the RF switch can be decreased to two, so that the RF switch cost can be reduced.

By means of this invention, by calculating calibration weights such that the phases of calibration signals received from antenna elements at the time of transmission of signals formed by combining main signals and calibration signals are phases which are conformity to antenna element intervals, the phases of the main signals input to each of the antenna elements from the beamformer can be accurately controlled as desired.

By means of this invention, by calculating calibration weights such that the phases of calibration signals received from antenna elements at the time of reception of signals formed by combining main signals and calibration signals are phases which are conformity to antenna element intervals, the phases of the main signals input to the beamformer from the antenna elements can be made equal.

Other features and advantages of the present invention will be apparent from the following description taken in conjunction with the accompanying drawings.

DESCRIPTION OF THE PREFERRED EMBODIMENTS

This invention relates to a calibration apparatus which calibrates the phases of main signals input to the antenna elements of an array antenna. In the calibration apparatus, a calibration signal generation portion generates calibration signals, and a signal combining portion combines the calibration signals with main signals, output from a beamformer, which are to be input to the antenna elements. An RF switch receives as inputs the signal radiated from other antenna elements through a first antenna element and the signal radiated from other antenna elements through a second antenna element, and switches between the input signals for input to the next-stage receiving portion. The receiving portion demodulates the input wireless signal, a calibration signal detection portion detects calibration signals from the demodulated signal, and a weight generation portion uses the detected calibration signals output from the antenna elements to calculate calibration weights used to control the phases of the main signals input to the antenna elements. A phase shifter executes control to shift the phases of the main signals input to the antenna elements, based on the calculated calibration weights. Specifically, the weight generation portion calculates the calibration weights such that the phases of calibration signals received from the antenna elements are phases which can be determined from the antenna element intervals. By this means, the phases of the main signals input from the beamformer to the antenna elements at the time of transmission can be made equal.

(A) First Embodiment

Figure 1:
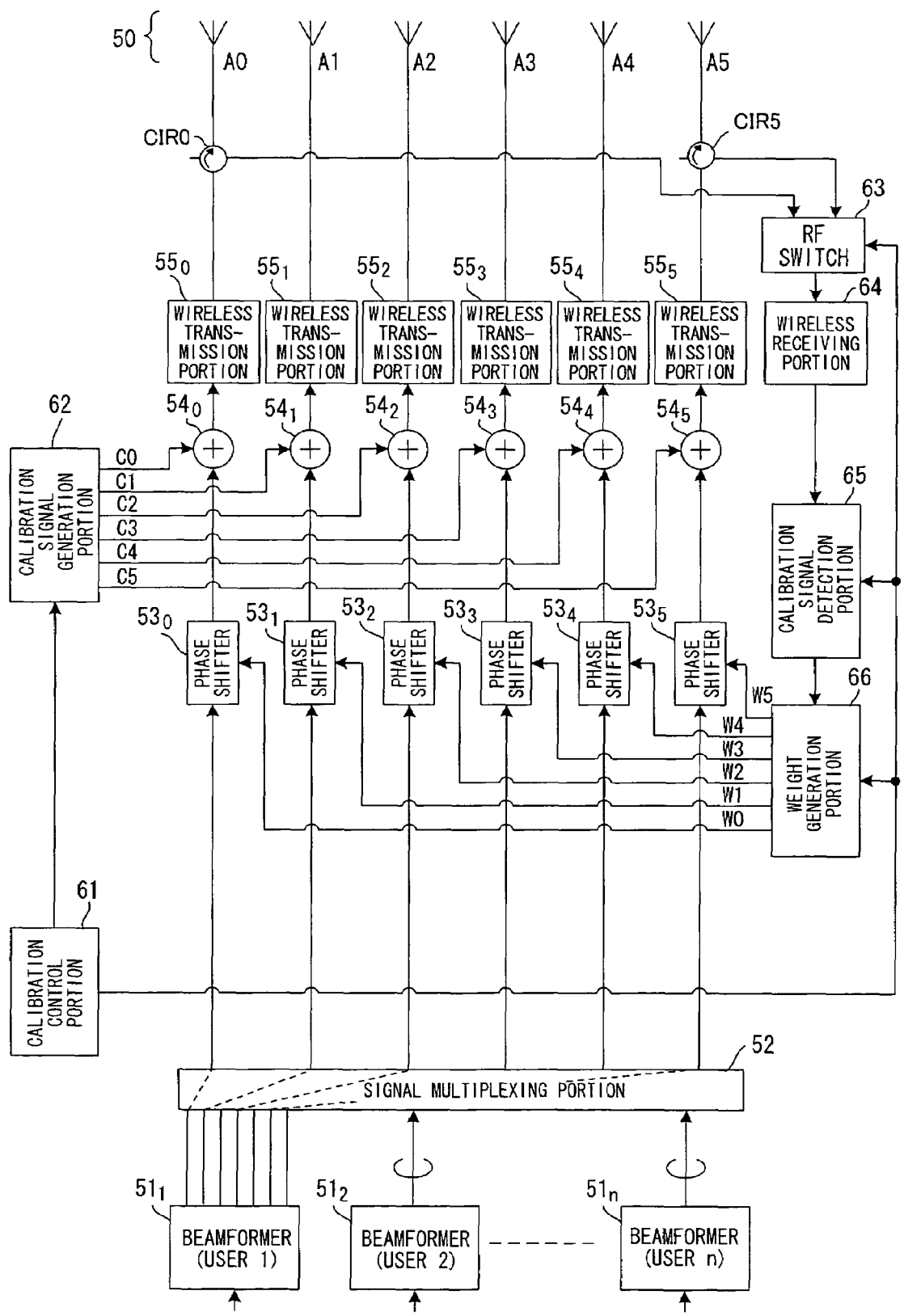
FIG. 1 shows the configuration of principal portions of a wireless transmission apparatus comprising the calibration apparatus of a first embodiment.

FIG. 1 shows the configuration of principal portions of a wireless transmission apparatus comprising the calibration apparatus of a first embodiment.

A direction estimation portion, not shown, receives a signal transmitted from a mobile station and estimates the direction of the mobile station. Beamformers $51_1$ to $51_n$ independently control the phases and amplitudes of signals for input to each of the antenna elements A0 to A5 of an array antenna 50 such that the peak is directed in directions in which mobile stations (users) 1 to n exist, to form a transmission beam pattern. The signal combining portion 52 spreads the signals input from the beamformers $51_1$ to $51_n$ using spreading codes allocated to users, and combines and outputs the signals for each user from each antenna element. Phase shifters $53_0$ to $53_5$ provided corresponding to antenna elements multiply weights for calibration, described below, by the transmission signals (called main signals) output from the signal combing portion 52, and input the results to wireless transmission portions $55_0$ to $55_5$ through adders $54_0$ to $54_5$. The wireless transmission portions $55_0$ to $55_5$ up-convert the frequencies of the main signals, which are baseband signals output from the phase shifters $53_0$ to $53_5$, to the wireless frequency, and then amplify and transmit the signals from the antenna elements A0 to A5. By this means, the main signal radio waves intended for the users 1 through n are transmitted with peaks respectively directed toward the mobile stations of the users 1 to n.

In order to perform phase calibration, a calibration start instruction is issued by the calibration control portion 61 to the calibration signal generation portion 62, RF switch 63, calibration signal detection portion 65, and weight generation portion 66. The calibration signal generation portion 62 generates calibration signals C0 to C4 based on the calibration start instruction. The adders $54_0$ to $54_4$ combine the calibration signals C0 to C4 with the main signals of the phase shifters $53_0$ to $53_4$, and the wireless transmission portions $55_0$ to $55_4$, after up-conversion to the wireless frequency of the frequency of the combined signals output from the adders $54_0$ to $54_4$, amplify and transmit the signals from the antenna elements A0 to A4.

The antenna element A5 electromagnetically receives signals radiated from the other antenna elements A0 to A4, and inputs the received signals to the RF switch 63 via the circulator CIR5. The RF switch 63 inputs the signals received by the antenna element A5 to the wireless receiving portion 64. The wireless receiving portion 64 frequency-converts the received signal to a baseband signal, and also demodulates and inputs the result to the calibration signal detection portion 65. The calibration signal detection portion 65 detects the calibration signals C0 to C4, radiated from the antenna elements A0 to A4, from the demodulated signals, and inputs the result to the weight generation portion 66. The weight generation portion 66 uses a method described below to calculate weight coefficients W0 to W4 such that the phase differences of the calibration signals C0 to C4 are phase differences determined by the antenna element intervals.

The calibration signal generation portion 62 then generates calibration signals C1 to C5. The adders $54_1$ to $54_5$ combine the main signals of the phase shifters $53_1$ to $53_5$ with the calibration signals C1 to C5, and the wireless transmission portions $55_1$ to $55_5$ up-convert the frequency of the combined signals output from the adders $54_1$ to $54_5$ to the wireless frequency, and amplify and transmit the signals from the antenna elements A1 to A5.

The antenna element A0 electromagnetically receives signals radiated from the other antenna elements A1 to A5, and inputs the received signals to the RF switch 63 via the circulator CIR0. The RF switch 63 inputs signals received by the antenna element A0 to the wireless receiving portion 64. The wireless receiving portion 64 frequency-converts the received signals into baseband signals, performs demodulation, and inputs the result to the calibration signal detection portion 65. The calibration signal detection portion 65 detects calibration signals C4 and C5 radiated from antenna elements A4 and A5 from the demodulated signals, and inputs the calibration signals to the weight generation portion 66. The weight generation portion 66 calculates the weight coefficient W5 causing the phase difference between the calibration signals C4 and C5 to be the phase difference determined from the antenna element interval. From the above, the weight coefficients W0 to W5 causing the phase differences between calibration signals C0 to C5 at the antenna elements to be phase differences determined from the antenna element intervals, and the weight generation portion 66 inputs these weight coefficients W0 to W5 into the phase shifters $53_0$ to $53_5$. The phase shifters $53_0$ to $53_5$ multiple the weight coefficients W0 to W5 by the main signals output from the signal combining portion 52. By this means, the phase differences between calibration signals C0 to C5 at the antenna elements are the phase differences determined from the antenna element intervals.

Phase Difference Detection Method

Figure 2:
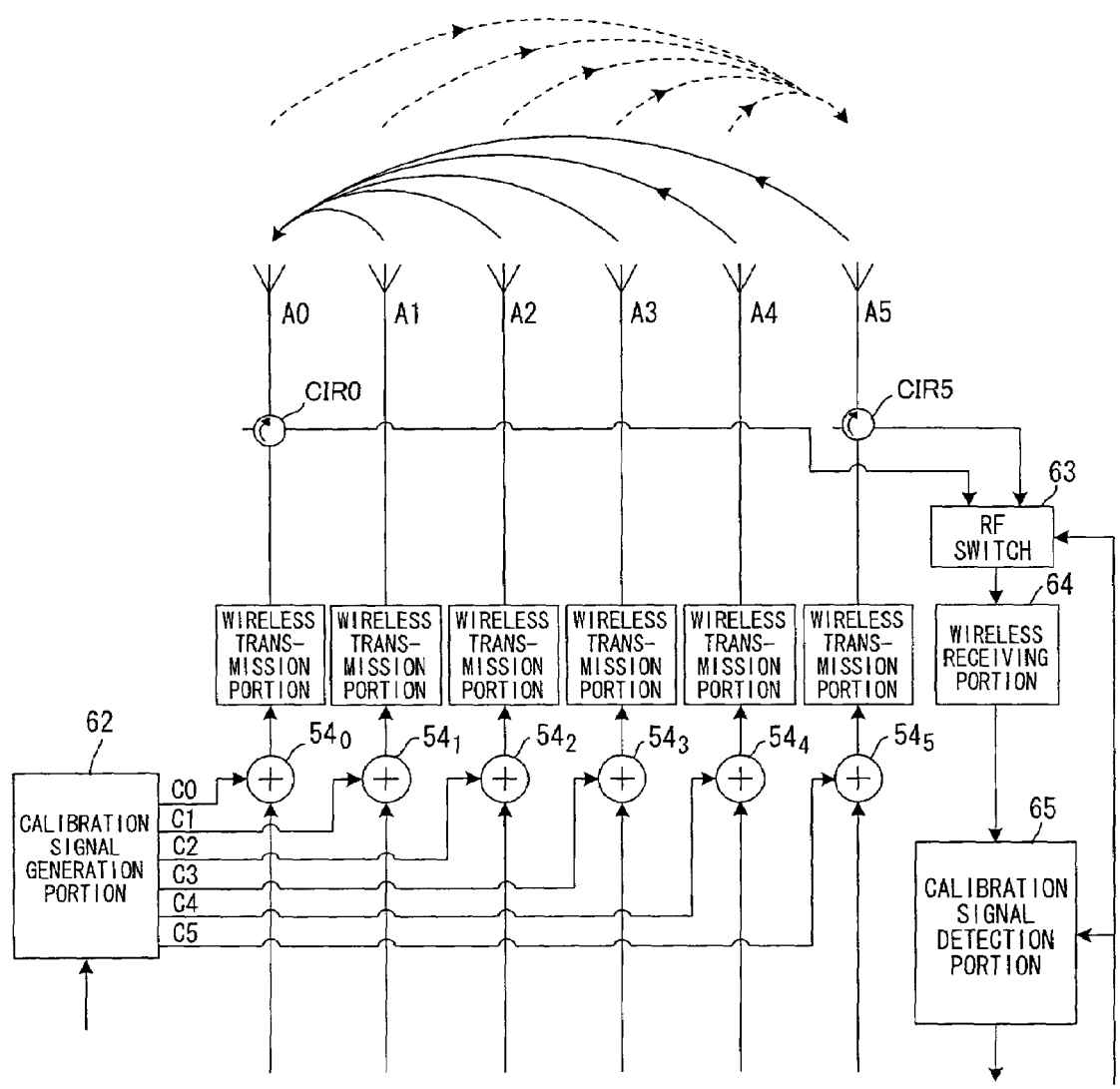
FIG. 2 explains the phase difference detection method shown in a portion of FIG. 1.

FIG. 2 explains the phase difference detection method shown in a portion of FIG. 1.

First, calibration signals C0 to C4 are radiated (see the dashed lines in FIG. 2) from antenna elements A0 to A4, and are received by antenna element 5. Here:

$d_{01}$: interval between antenna elements A0 and A1
$d_{02}$: interval between antenna elements A0 and A2
$d_{03}$: interval between antenna elements A0 and A3
$d_{04}$: interval between antenna elements A0 and A4
$d_{05}$: interval between antenna elements A0 and A5
$d_{12}$: interval between antenna elements A1 and A2
$d_{23}$: interval between antenna elements A2 and A3
$d_{34}$: interval between antenna elements A3 and A4
$d_{45}$: interval between antenna elements A4 and A5 Further,
$\psi_0$: calibration signal phase for antenna element A0
$\psi_1$: calibration signal phase for antenna element A1
$\psi_2$: calibration signal phase for antenna element A2
$\psi_3$: calibration signal phase for antenna element A3
$\psi_4$: calibration signal phase for antenna element A4
$\phi_5$: Phase of signal received by antenna element A5

At this time, the phases of the calibration signals from the other antenna elements, received by the antenna element A5, are expressed as follows, where $\lambda$ is the wavelength.

Phase of calibration signal from antenna element A0:

$\theta_{05} = \psi_0 - 2\pi d_{05}/\lambda + \phi_5$

Phase of calibration signal from antenna element A1:

$\theta_{15} = \psi_1 - 2\pi d_{15}/\lambda + \phi_5$

Phase of calibration signal from antenna element A2:

$\theta_{25} = \psi_2 - 2\pi d_{25}/\lambda + \phi_5$

Phase of calibration signal from antenna element A3:

$\theta_{35} = \psi_3 - 2\pi d_{35}/\lambda + \phi_5$

Phase of calibration signal from antenna element A4:

$\theta_{45} = \psi_4 - 2\pi d_{45}/\lambda + \phi_5$

As an example, phase differences between adjacent antenna elements are determined. From the above equations, the differences in the calibration signals from the different antenna elements are:

$$\theta_{15} - \theta_{05} = \psi_1 - \psi_0 + 2\pi d_{01}/\lambda \quad (1)$$

$$\theta_{25} - \theta_{15} = \psi_2 - \psi_1 + 2\pi d_{12}/\lambda \quad (2)$$

$$\theta_{35} - \theta_{25} = \psi_3 - \psi_2 + 2\pi d_{23}/\lambda \quad (3)$$

$$\theta_{45} - \theta_{35} = \psi_4 - \psi_3 + 2\pi d_{34}/\lambda \quad (4)$$

Equation (1) is the difference in phases of the antenna elements A0-A1, equation (2) is the difference in phases of the antenna elements A1-A2, equation (3) is the difference in phases of the antenna elements A2-A3, and equation (4) is the difference in phases of the antenna elements A3-A4. The intervals between antenna elements are known quantities, and by using $\psi_0$ as reference, the differences in phases of the calibration signals for the antenna elements can be determined.

Similarly, calibration signals are radiates from antenna element A4 and from antenna element A5 and are received by antenna element A0, and by determining the calibration signal phase difference, the phase difference between the calibration signals for antenna element A4 and antenna element A5 can be determined using the following equation.

$$\theta_{40} - \theta_{50} = \psi_4 - \psi_5 + 2\pi d_{45}/\lambda \quad (5)$$

The weight generation portion 66 takes $\psi_0$ as reference in determining phase differences from equations (1) through (5), calculates weight coefficients W0 to W5 such that the phase differences are all $+2\pi d_{xx}/\lambda$, and inputs these to the phase shifters $53_0$ to $53_5$.

According to the first embodiment, the number of signals to be switched by the RF switch can be made two, regardless of the number of antenna elements of the array antenna at the time of transmission to a mobile station, so that the cost of the RF switch can be reduced. According to the first embodiment, by calculating calibration weights such that the phases of calibration signals received from each of the antenna elements at the time of transmission of signals combining main signals and calibration signals are phases determined by the antenna element intervals, the phases of the main signals for input to the antenna elements from the beamformers can be made equal.

(B) Second Embodiment

Figure 3:
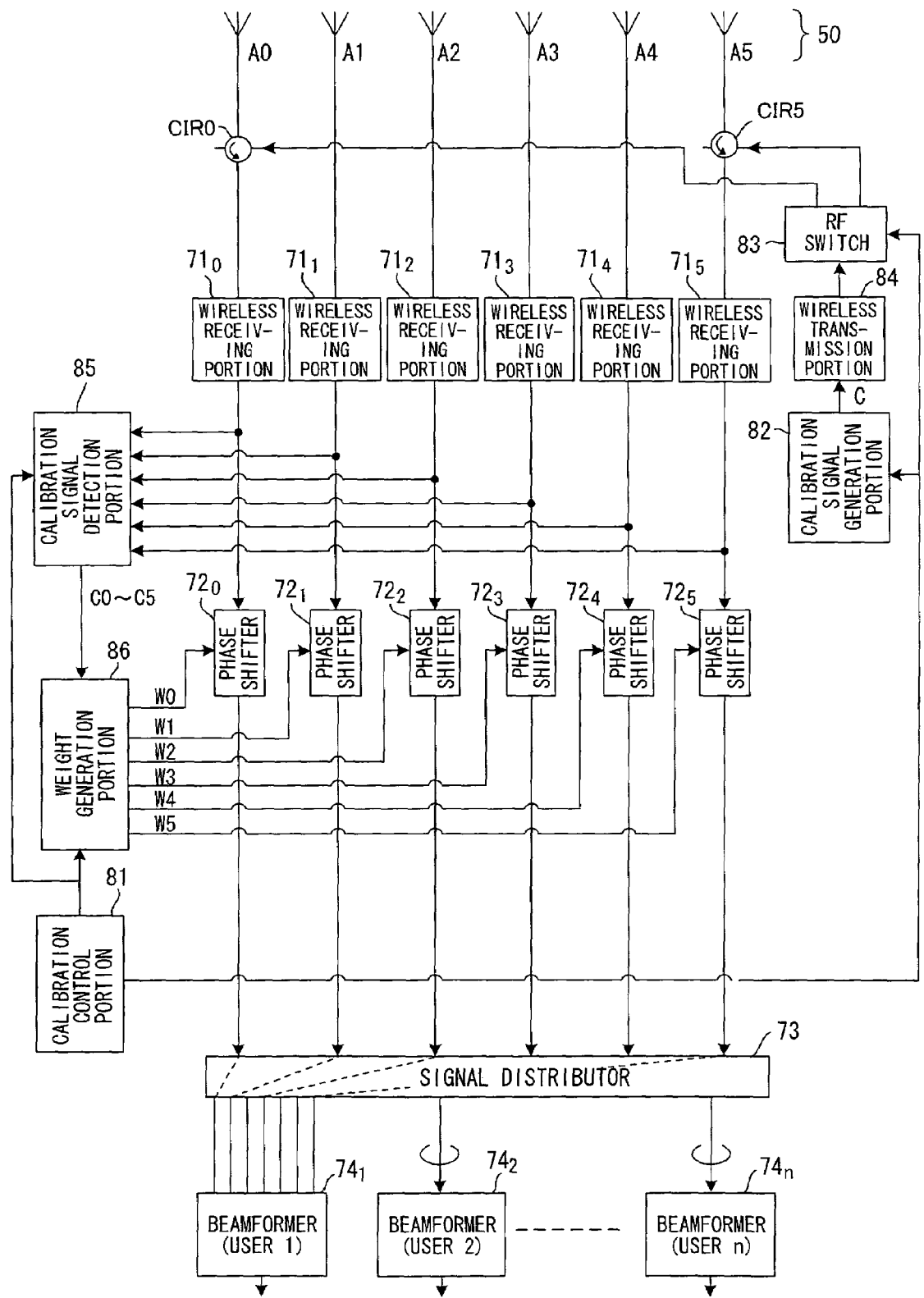
FIG. 3 shows the configuration of principal portions of a wireless receiving apparatus comprising the calibration apparatus of a second embodiment.

FIG. 3 shows the configuration of principal portions of a wireless receiving apparatus comprising the calibration apparatus of a second embodiment.

The wireless signals from different mobile stations, input to the different antenna elements A0 to A5 of the array antenna 50, are input to the wireless receiving portions $71_0$ to $71_5$ corresponding to the antenna elements. The wireless receiving portions $71_0$ to $71_5$ frequency-convert the wireless signals into baseband signals, which are input to the phase shifters $72_0$ to $72_5$. The phase shifters $72_0$ to $72_5$ multiply the calibration weights W0 to W5 described below by the received signals (called main signals) output from the wireless receiving portions $71_0$ to $71_5$, and input the result to the signal distributor 73. The signal distributor 73 performs reverse-spreading of signals input from the phase shifters $72_0$ to $72_5$ using spreading codes allocated to users, and separates the signals for users, inputting each to the beamformers $74_1$ to $74_n$ for each user. Each beamformer $74_1$ to $74_n$ independently controls the phase and amplitude of signals input from the antenna elements A0 to A5 of the array antenna 50 such that radio waves are received from the directions in which mobile stations (users, 1 to n) exist, and combines and outputs the result.

On the other hand, in order to perform phase calibration, the calibration control portion 81 issues an instruction to start calibration to the calibration signal generation portion 82, RF switch 83, calibration signal detection portion 85, and weight generation portion 86.

The calibration signal generation portion 82 generates calibration signals and inputs the signals to the wireless transmission portion 84, C based on the calibration start instruction. The wireless transmission portion 84 up-converts the frequency of the calibration signals and inputs the wireless signals to the RF switch 83. The RF switch 83 first transmits the calibration signals from the antenna element A5 via the circulator CIR5. The other antenna elements A0 to A4 receive the wireless calibration signals radiated from the antenna element A5, and input the signals to the wireless receiving portions $71_0$ to $71_4$. The wireless receiving portions $71_0$ to $71_4$ frequency-convert the wireless signals into baseband calibration signals, perform demodulation, and input the signals to the calibration signal detection portion 85. The calibration signal detection portion 85 detects the calibration signals C0 to C4 received by the antenna elements A0 to A4 from the demodulated signals, and inputs these signals to the weight generation portion 86. The weight generation portion 86 uses a method described below to calculate weight coefficients W0 to W4 such that the phase differences of the calibration signals C0 to C4 are phases determined from the antenna element intervals.

When calculation of the weight coefficients W0 to W4 is completed, the RF switch 83 then wirelessly transmits the calibration signal C from the antenna element A0 via the circulator CIR0. The other antenna elements A1 to A5 receive the wireless calibration signal radiated from the antenna element A0 and input the signals to the wireless receiving portions $71_1$ to $71_5$. The wireless receiving portions $71_1$ to $71_5$ frequency-convert the wireless signals into baseband calibration signals, perform demodulation, and input the signals to the calibration signal detection portion 85. The calibration signal detection portion 85 detects from the demodulated signals the calibration signals C4 and C5 received by the antenna elements A4 and A5, and inputs the calibration signals to the weight generation portion 86. The weight generation portion 86 uses a method described below to calculate the weight coefficient W5 such that the phase difference between the calibration signals C4 and C5 is the phase difference determined from the antenna element interval.

In this way, the weight coefficients W0 to W5 are determined such that the phase differences of the calibration signals C0 to C5 received by the antenna elements A0 to A5 at the input terminals of the signal distributor 73 are zero, and the weight generation portion 86 inputs these weight coefficients W0 to W5 to the phase shifters $72_0$ to $72_5$. The phase shifters $72_0$ to $72_5$ multiply these weight coefficients W0 to W5 by the main signals for input to the signal distributor 73. By this means, the phase differences of the calibration signals C0 to C5 at the input terminals of the signal distributor 73 become the phase differences determined from the antenna element intervals.

Phase Difference Detection Method

Figure 4:
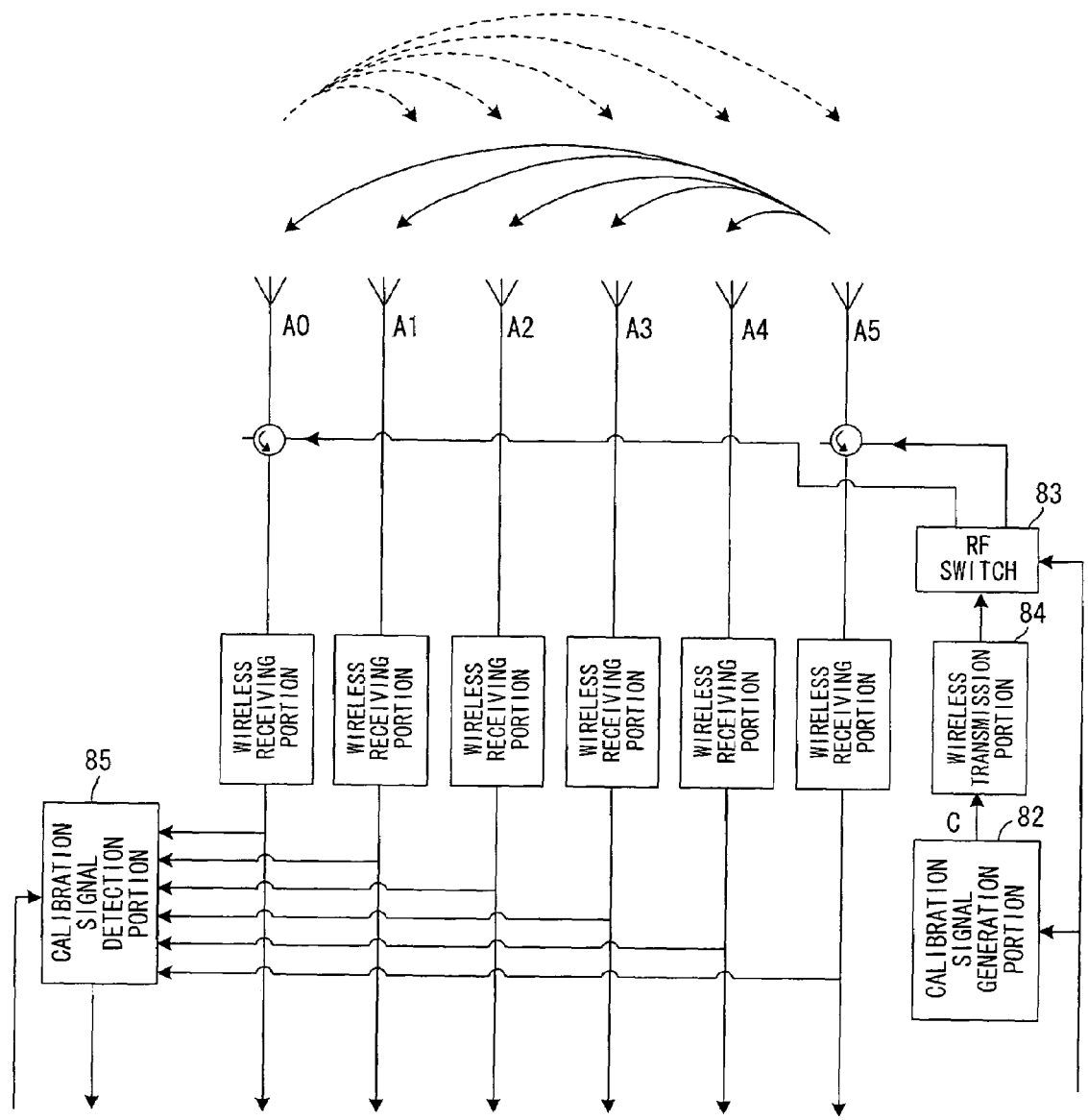
FIG. 4 explains the phase difference detection method shown in a portion of FIG. 3.

FIG. 4 explains the phase difference detection method shown in a portion of FIG. 3.

First, a calibration signal C is radiated from the antenna element A5 (see the solid lines in FIG. 4), and this is received by the antenna elements A0 to A4. Here, $d_{01}$: interval between antenna elements A0 and A1
$d_{02}$: interval between antenna elements A0 and A2
$d_{03}$: interval between antenna elements A0 and A3
$d_{04}$: interval between antenna elements A0 and A4
$d_{05}$: interval between antenna elements A0 and A5
$d_{12}$: interval between antenna elements A1 and A2
$d_{23}$: interval between antenna elements A2 and A3
$d_{34}$: interval between antenna elements A3 and A4
$d_{45}$: interval between antenna elements A4 and A5 Further, $\psi_0$: receiving portion phase for antenna element A0
$\psi_1$: receiving portion phase for antenna element A1
$\psi_2$: receiving portion phase for antenna element A2
$\psi_3$: receiving portion phase for antenna element A3
$\psi_4$: receiving portion phase for antenna element A4
$\phi_5$: transmission phase for antenna element A5

At this time, the phases of the calibration signals received by the antenna elements and input to the calibration signal detection portion 85 are expressed as follows, where λ is the wavelength.

Phase of calibration signal received by antenna element A0:

$$\theta_{05} = \psi_0 - 2\pi d_{05}/\lambda + \phi_5$$

Phase of calibration signal received by antenna element A1:

$$\theta_{15} = \psi_1 - 2\pi d_{15}/\lambda + \phi_5$$

Phase of calibration signal received by antenna element A2:

$$\theta_{25} = \psi_2 - 2\pi d_{25}/\lambda + \phi_5$$

Phase of calibration signal received by antenna element A3:

$$\theta_{35} = \psi_3 - 2\pi d_{35}/\lambda + \phi_5$$

Phase of calibration signal received by antenna element A4:

$$\theta_{45} = \psi_4 - 2\pi d_{45}/\lambda + \phi_5$$

As an example, phase differences between adjacent antenna elements are determined. From the above equations, the differences in the calibration signals received by the different antenna elements are:

$$\theta_{15} - \theta_{05} = \psi_1 - \psi_0 + 2\pi d_{01}/\lambda \quad (6)$$

$$\theta_{25} - \theta_{15} = \psi_2 - \psi_1 + 2\pi d_{12}/\lambda \quad (7)$$

$$\theta_{35}-\theta_{25}=\psi_3-\psi_2+2\pi d_{23}/\lambda \quad (8)$$

$$\theta_{45}-\theta_{35}=\psi_4-\psi_3+2\pi d_{34}/\lambda \quad (9)$$

Equation (6) is the difference in phases of the antenna elements A0-A1, equation (7) is the difference in phases of the antenna elements A1-A2, equation (8) is the difference in phases of the antenna elements A2-A3, and equation (9) is the difference in phases of the antenna elements A3-A4. The intervals between antenna elements are known quantities, and by using $\psi_0$ as reference, the differences in phases of the calibration signals for the antenna elements can be determined.

Similarly, a wireless calibration signal is radiated from the antenna element A0 (see the dashed lines in FIG. 4) and is received by the antenna elements A1 to A5, and by determining the phase differences in the calibration signals of antenna elements A4 and A5, the phase difference between calibration signals of the antenna element A4 and the antenna element A5 can be determined using the equation $$\theta_{40}-\theta_{50}=\psi_4-\psi_5+2\pi d_{45}/\lambda \quad (10)$$

The weight generation portion 86 determines the phase differences from equations (9) and (10) with $\psi_0$ as reference, and calculates the weight coefficients W0 to W5 such that the phase differences become equal to $2\pi d_{xx}/\lambda$, and inputs the coefficients to the phase shifters $72_{0\ to\ 72_5}$.

According to the second embodiment, the number of signals switched by the RF switch can be made two, regardless of the number of antenna elements of the array antenna at the time of reception from a mobile station, so that the cost of the RF switch can be decreased. Further, according to the second embodiment, by calculating calibration weights such that the phases of calibration signals received from each of the antenna elements at the time of reception of signals combining main signals and calibration signals is $2\pi d_{xx}/\lambda$, the phases of the main signals for input from the antenna elements to the beamformers can be made equal.

(C) Third Embodiment

Figure 5:
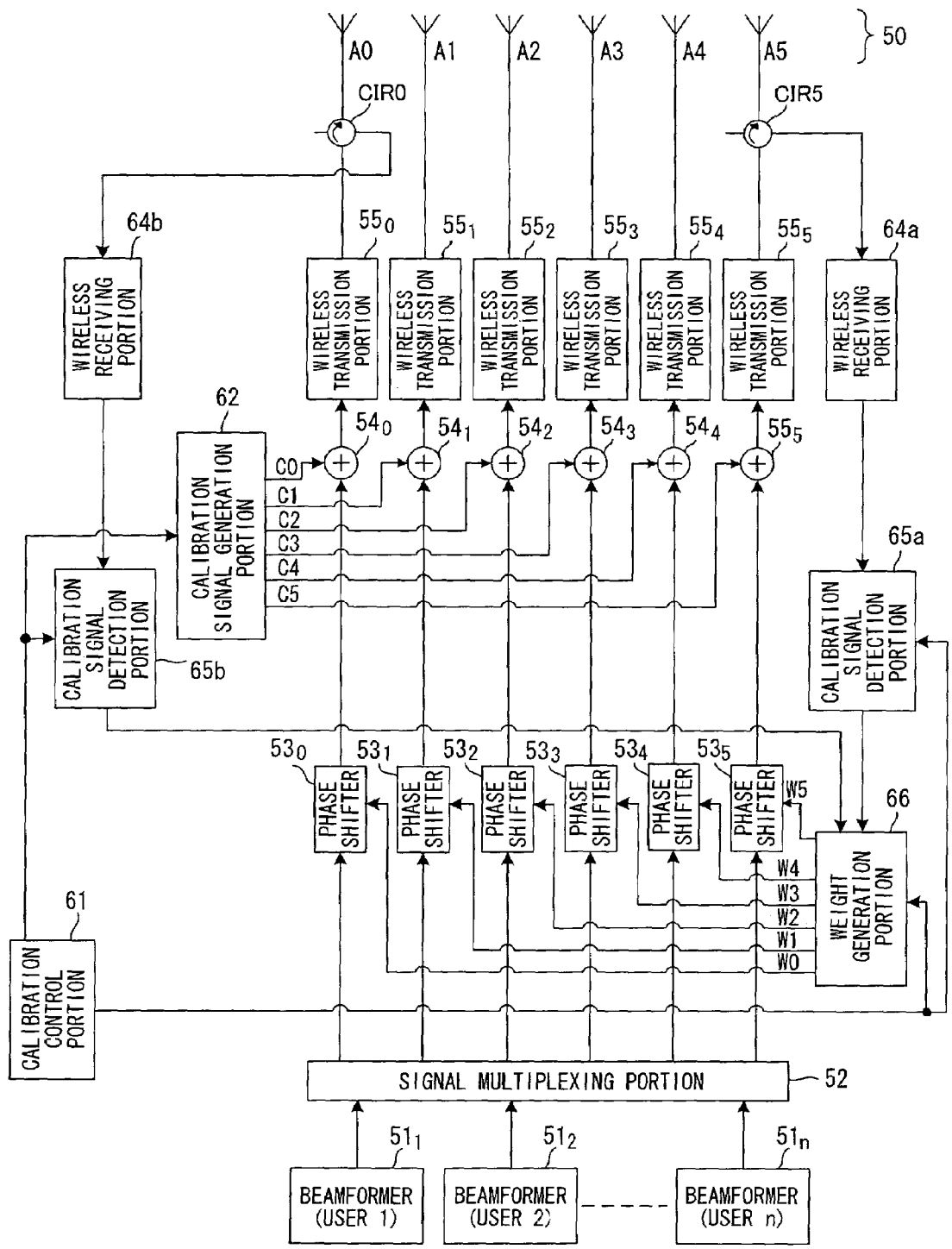
FIG. 5 shows the configuration of principal portions of a wireless transmission apparatus comprising the calibration apparatus of a third embodiment.

FIG. 5 shows the configuration of principal portions of a wireless transmission apparatus comprising the calibration apparatus of a third embodiment. Portions which are the same as in the first embodiment of FIG. 1 are assigned the same symbols. Differences are the removal of the RF switch 63, and provision of a dual calibration wireless receiving system (wireless receiving portion 64a and calibration signal detection portion 65a, and wireless receiving portion 64b and calibration signal detection portion 65b).

In order to perform phase calibration, the calibration control portion 61 issues calibration start instructions to the calibration signal generation portion 62, calibration signal detection portions 65a, 65b, and weight generation portion 66. The calibration signal generation portion 62 generates calibration signals C0 to C4 based on the calibration start instruction. The adders $54_0$ to $54_4$ combine the main signals of the phase shifters $53_0$ to $53_4$ with the calibration signals C0 to C4, and the wireless transmission portions $55_0$ to $55_4$ up-convert the frequency of the combined signal output from the adders $54_0$ to $54_4$ to a wireless frequency, and amplify and transmit the signals from the antenna elements A0 to A4.

The antenna element A5 electromagnetically receives signals radiated from the other antenna elements A0 to A4, and inputs the received signals to the wireless receiving portion 64a via the circulator CIR5. The wireless receiving portion 64a frequency-converts the received signals into baseband signals, and demodulates and inputs the signals to the calibration signal detection portion 65a. The calibration signal detection portion 65a detects, from the demodulated signals, the calibration signals C0 to C4 radiated from the antenna elements A0 to A4, and inputs these signals into the weight generation portion 66. The weight generation portion 66 the same method as in the first embodiment to calculate weight coefficients W0 to W4 such that the phase differences of the calibration signals C0 to C4 are zero.

Then, the calibration signal generation portion 62 generates calibration signals C1 to C5. The adders $54_1$ to $54_5$ combine the main signals of the phase shifters $53_1$ to $53_5$ with the calibration signals C1 to C5, and the wireless transmission portions $55_1$ to $55_5$, after up-converting the frequency of the combined signals output from the adders $54_1$ to $54_5$ to the wireless frequency, amplifies and transmits the signals from the antenna elements A1 to A5. The antenna element A0 electromagnetically receives the signals radiated from the other antenna elements A1 to A5, and inputs the received signals to the wireless receiving portion 64b via the circulator CIRO. The wireless receiving portion 64b frequency-converts the received signals into baseband signals, and demodulates and inputs the signals to the calibration signal detection portion 65b. The calibration signal detection portion 65b detects, from the demodulated signals, the calibration signals C4 and C5 radiated from the antenna elements A4 and A5, and inputs the calibration signals to the weight generation portion 66. The weight generation portion 66 calculates the weight coefficient W5 such that the phase difference between the calibration signals C4 and C5 is the phase determined by the antenna element interval. From the above, the weight coefficients W0 to W5 for which the phase differences in the calibration signals C0 to C5 at the antenna elements are zero are determined, and the weight generation portion 66 inputs these weight coefficients W0 to W5 to the phase shifters $53_0$ to $53_5$. The phase shifters $53_0$ to $53_5$ multiplies the weight coefficients W0 to W5 by the main signals output from the signal combining portion 52. By this means, the phase differences in the calibration signals C0 to C5 at the antenna elements are phases determined from the antenna element intervals.

By means of the third embodiment, a calibration apparatus which does not use an expensive RF switch can be configured.

(D) Fourth Embodiment

Figure 6:
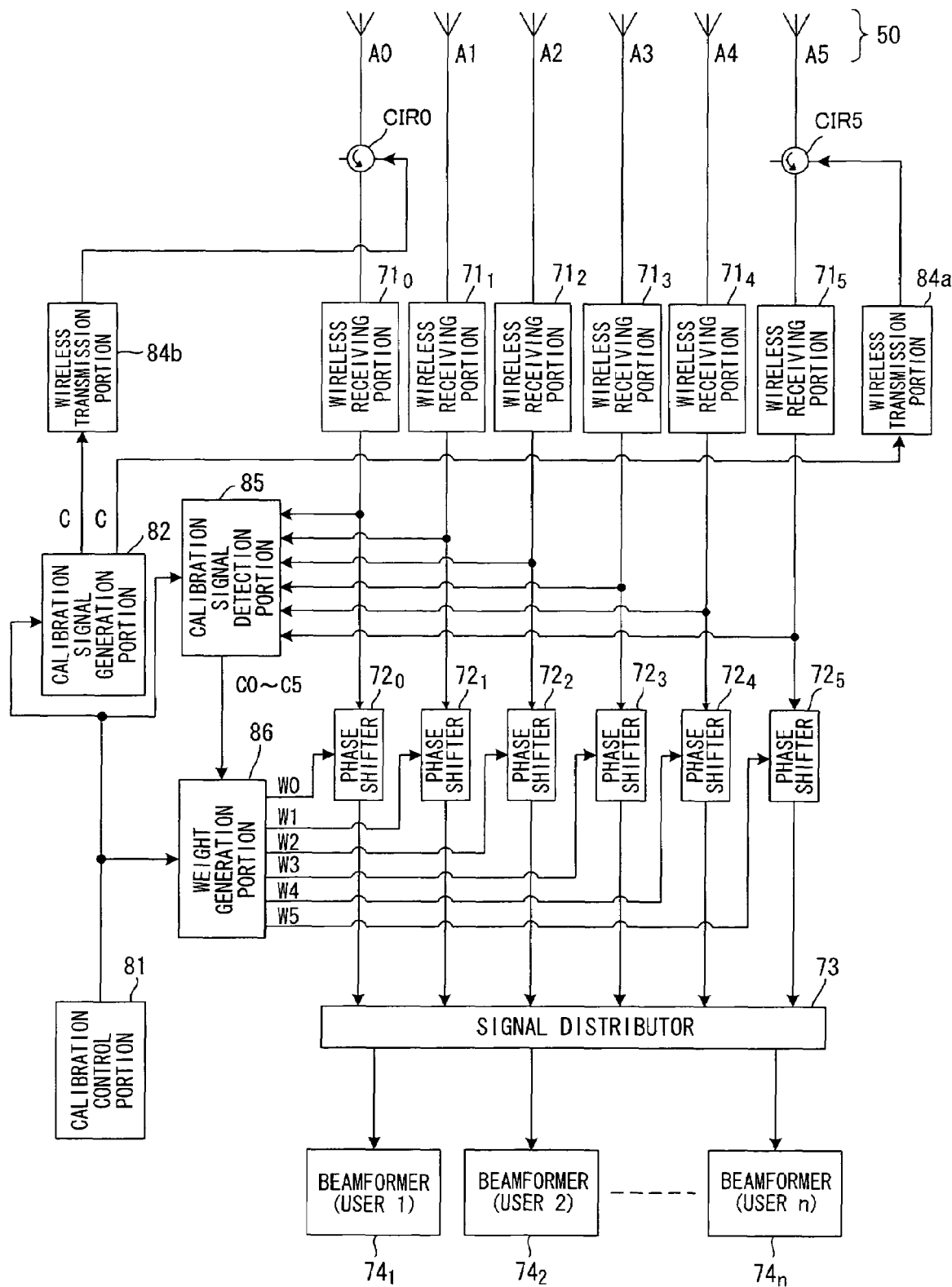
FIG. 6 shows the configuration of principal portions of a wireless receiving apparatus comprising the calibration apparatus of a fourth embodiment.

FIG. 6 shows the configuration of principal portions of a wireless receiving apparatus comprising the calibration apparatus of a fourth embodiment. Portions which are the same as in the second embodiment of FIG. 3 are assigned the same symbols. Differences are the removal of the RF switch 83, and provision of two wireless transmission portions 84a, 84b.

In order to perform phase calibration, a calibration start instruction is issued by the calibration control portion 81 to the calibration signal generation portion 82, calibration signal detection portion 85, and weight generation portion 86. Based on the calibration start instruction, the calibration signal generation portion 82 generates a calibration signal C, which is input to the wireless transmission portion 84a. The wireless transmission portion 84a up-converts the frequency of the calibration signal and transmits the calibration signal as a wireless signal using the antenna element A5, via the circulator CIR5. The other antenna elements A0 to A4 receive the wireless calibration signal radiated from the antenna element A5, and input the signals to the wireless receiving portions 71₀ to 71₄. The wireless receiving portions 71₀ to 71₄ frequency-convert the wireless signals to baseband calibration signals, and demodulate and input the signals to the calibration signal detection portion 85. The calibration signal detection portion 85 detects, from the demodulated signals, the calibration signals C0 to C4 received by the antenna elements A0 to A4, and inputs the calibration signals to the weight generation portion 86. The weight generation portion 86 uses the same method as in the second embodiment to calculate weight coefficients W0 to W4 such that the phase differences of the calibration signals C0 to C4 are phases determined from the antenna element intervals.

When the weight coefficients W0 to W4 are determined, the calibration signal generation portion 82 inputs a calibration signal C to the wireless transmission portion 84b. The wireless transmission portion 84b up-converts the frequency of the calibration signal and transmits the calibration signal as a wireless signal using the antenna element A0, via the circulator CIRO. The other antenna elements A1 to A5 receive the wireless calibration signals radiated from the antenna element A0, and input the signals to the wireless receiving portions 71₁ to 71₅. The wireless receiving portions 71₁ to 71₅ frequency-convert the wireless signals to baseband calibration signals, and demodulate and input the signals to the calibration signal detection portion 85. The calibration signal detection portion 85 detects, from the demodulated signals, the calibration signals C4 and C5 received by the antenna elements A4 and A5, and inputs these signals to the weight generation portion 86. The weight generation portion 86 uses the method described below to calculate the weight coefficient W5 such that the phase difference between the calibration signals C4 and C5 is a phase which can be determined from the antenna element interval.

From the above, weight coefficients W0 to W5 are determined such that the phase differences of the calibration signals C0 to C5 in the signal distributor 73 are phases determined from the antenna element intervals, and the weight generation portion 86 inputs these weight coefficients W0 to W5 to the phase shifters 72₀ to 72₅. The phase shifters 72₀ to 72₅ multiply the weight coefficients W0 to W5 by the main signals for input to the signal distributor 73. By this means, the phase differences among calibration signals C0 to C5 at the input terminals of the signal distributor are phases determined from the antenna element intervals.

By means of the fourth embodiment, a calibration apparatus which does not use an expensive RF switch can be configured.

(E) Fifth Embodiment

Figure 7:
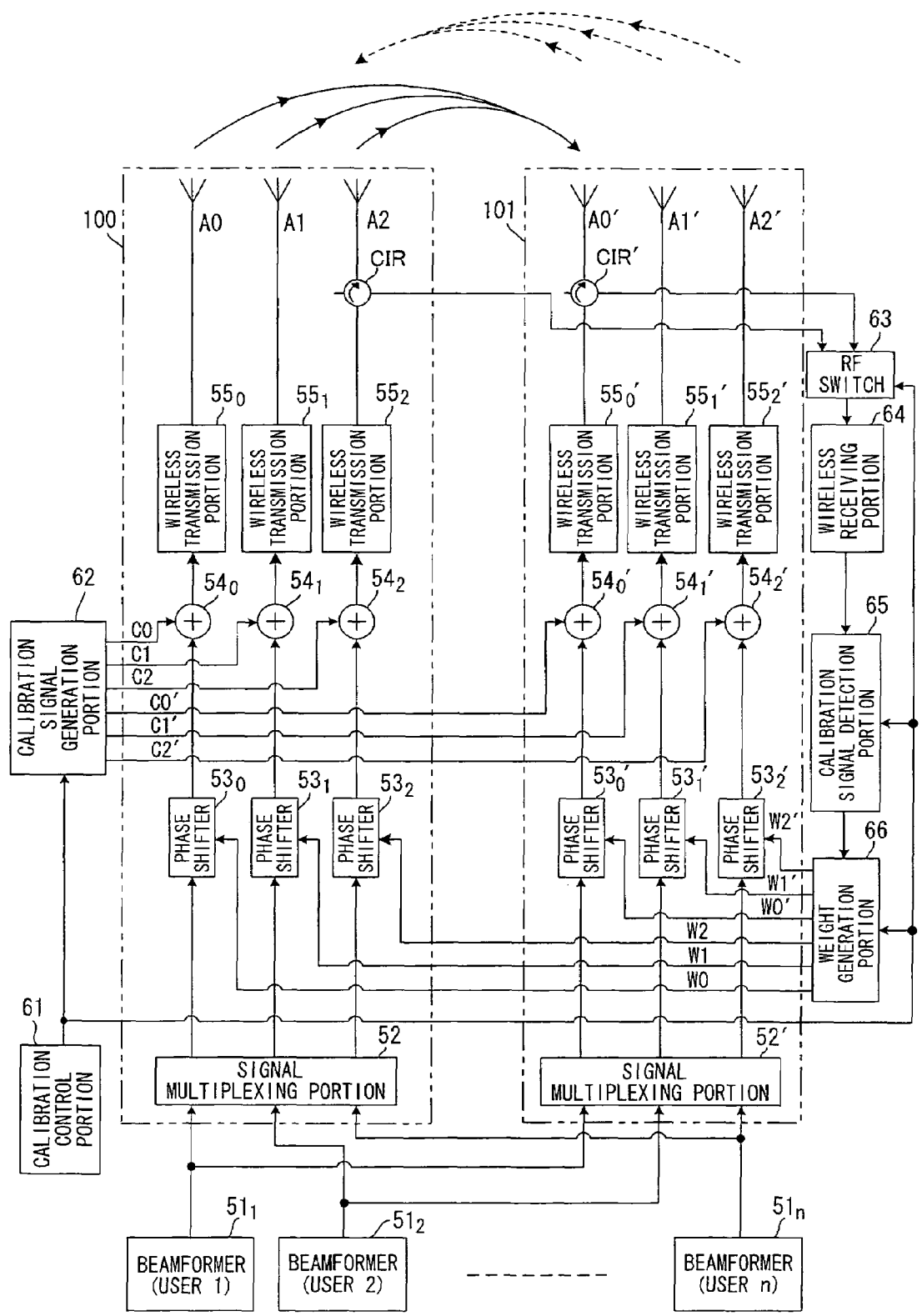
FIG. 7 shows the configuration of principal portions of a wireless transmission apparatus comprising the calibration apparatus of a fifth embodiment.

FIG. 7 shows the configuration of principal portions of a wireless transmission apparatus comprising the calibration apparatus of a fifth embodiment. Portions which are the same as in the first embodiment of FIG. 1 are assigned the same symbols. Differences are (1) the transmission diversity configuration, with first and second transmission portions 100, 101 having the same configuration provided; (2) the fact that signals radiated from all the antenna elements A0' to A2' of the second transmission portion 101 are received by the single antenna element A2 of the first transmission portion 100 and input to the RF switch 63; (3) the fact that signals radiated from all the antenna elements A0 to A2 of the first transmission portion 100 are received by the single antenna element A0' of the second transmission portion 101 and input to the RF switch 63; and, (4) the fact that during normal data transmission, the transmission portion 100 and the transmission portion 101 perform simultaneous diversity transmission of the same signals.

In order to perform phase calibration in this wireless transmission apparatus with a diversity configuration, the calibration control portion 61 issues a calibration start instruction to the calibration signal generation portion 62, RF switch 63, calibration signal detection portion 65, and weight generation portion 66. Based on the calibration start instruction, the calibration signal generation portion 62 generates calibration signals C0 to C2 in order to perform calibration of the first transmission portion 100. The adders 54₀ to 54₂ of the first transmission portion 100 combine the main signals of the phase shifters 53₀ to 53₂ with the calibration signals C0 to C2, and the wireless transmission portions 55₀ to 55₂ up-convert the frequency of the combined signals output from the adders 54₀ to 54₂ to the wireless frequency, and amplify and transmit the signals from the antenna elements A0 to A2.

The antenna element A0' of the second transmission portion 101 electromagnetically receives signals radiated from the antenna elements A0 to A2 of the first transmission portion 100, and inputs the received signals to the RF switch 63 via the circulator CIR'. The RF switch 63 inputs the signals received by the antenna element A0' to the wireless receiving portion 64. The wireless receiving portion 64 frequency-converts the received signals to baseband signals, and demodulates and inputs the signals to the calibration signal detection portion 65. The calibration signal detection portion 65 uses the demodulated signals to detect the calibration signals C0 to C2 radiated from the antenna elements A0 to A2, and inputs the calibration signals to the weight generation portion 66. The weight generation portion 66 uses the method explained in the first embodiment to calculate weight coefficients W0 to W2 such that the phase differences of the calibration signals C0 to C2 are the phases determined from the antenna element intervals.

By this means, weight coefficients W0 to W2 are determined such that the phase differences of the calibration signals C0 to C2 at the antenna elements are the phases determined from the antenna element intervals. The weight generation portion 66 inputs these weight coefficients W0 to W2 to the phase shifters 53₀ to 53₂ of the first transmission portion 100. The phase shifters 53₀ to 53₂ multiply the weight coefficients W0 to W2 by the main signals output from the signal combining portion 52. By this means, the phase differences of the calibration signals C0 to C2 at the antenna elements are equal to the phases determined from the antenna element intervals.

When calculation of the weight coefficients for the first transmission portion 100 is completed, the calibration signal generation portion 62 generates calibration signals C0' to C2', in order to perform calibration of the second transmission portion 101. The adders 54₀' to 54₂' of the second transmission portion 101 combine the main signals of the phase shifters 53₀' to 53₂' with the calibration signals C0' to C2', and the wireless transmission portions 55₀' to 55₂' up-convert the frequency of the combined signals output from the adders 54₀' to 54₂' to the wireless frequency, and amplify and transmit the signals from the antenna elements A0' to A2'. The antenna element A2 of the first transmission portion 100 electromagnetically receives the signals radiated from the antenna elements A0' to A2' of the second transmission portion 101, and inputs the received signals to the RF switch 63 via the circulator CIR. The RF switch 63 inputs the signals received by the antenna element A2 to the wireless receiving portion 64. Subsequently, the weight coefficients W0' to W2' for the second transmission portion 101 are determined in a manner similar to the case for the first transmission portion 100, and so by inputting the weight coefficients W0' to W2' to the phase shifters $53_0'$ to $53_2'$ of the second transmission portion 101, the phase differences of the calibration signals C0' to C2' at the antenna elements can be made equal to the phases determined from the antenna element intervals.

By means of the fifth embodiment, even in wireless apparatus adopting a transmission diversity configuration, the number of signals switched by the RF switch can be made two, regardless of the number of antennas, so that the RF switch cost can be decreased. Moreover, a configuration may be employed similar to the fifth embodiment in which there are two receiving portions.

(F) Sixth Embodiment

Figure 8:
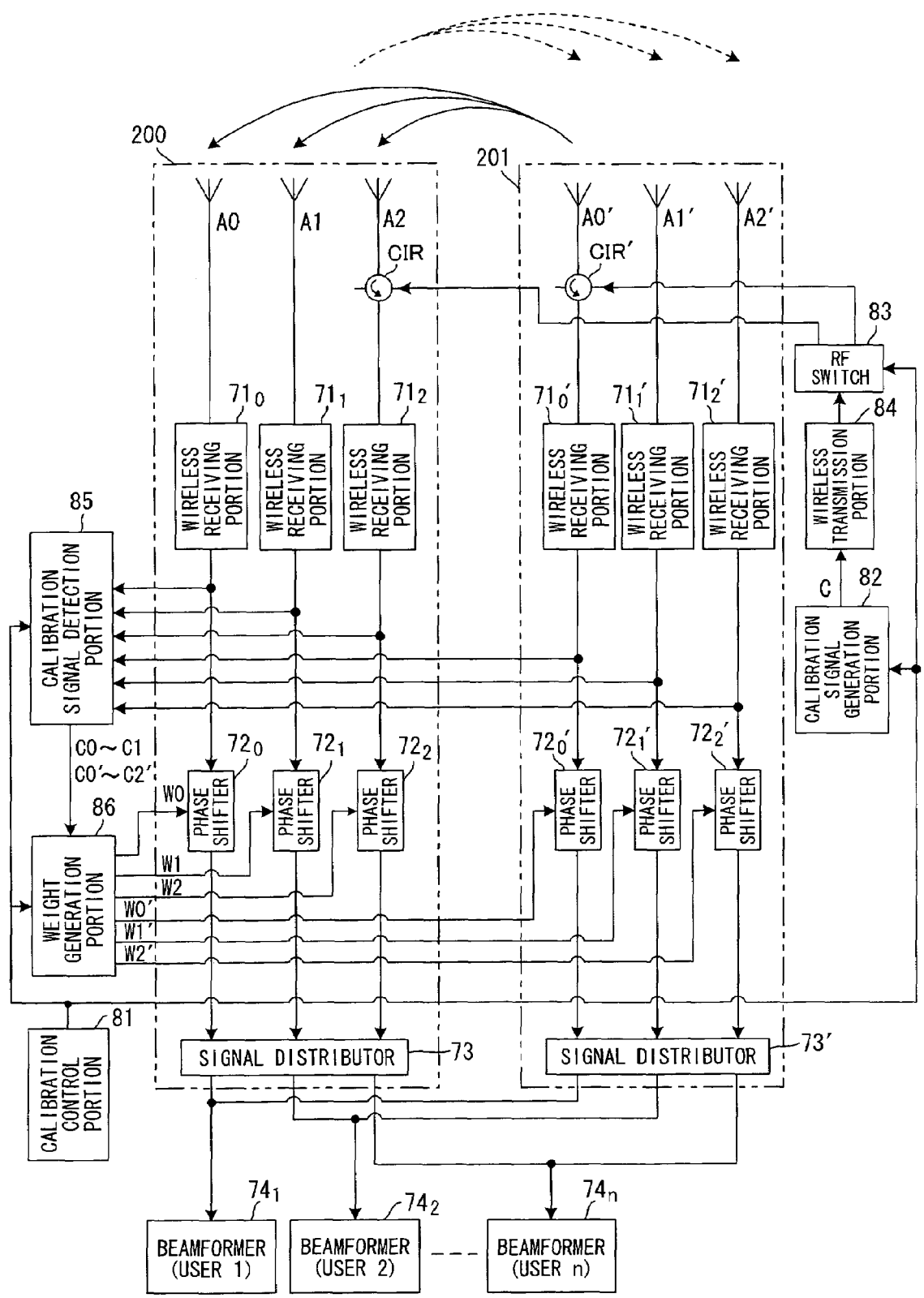
FIG. 8 shows the configuration of principal portions of a wireless receiving apparatus comprising the calibration apparatus of a sixth embodiment.

FIG. 8 shows the configuration of principal portions of a wireless receiving apparatus comprising the calibration apparatus of a sixth embodiment. Portions which are the same as in the second embodiment of FIG. 3 are assigned the same symbols. Differences are (1) the adoption of a reception diversity configuration, and provision of first and second receiving portions 200, 201 with the same configuration; (2) the fact that signals radiated from the antenna element A0' of the second receiving portion 201 are received by all the antenna elements A1 and A2 of the first receiving portion 200; (3) the fact that signals radiated from the antenna element A2 of the first receiving portion 200 are received by all the antenna elements A0' to A2' of the second receiving portion 201; and, (4) the fact that at the time of data reception the first and second receiving portions 200, 201 perform simultaneous diversity reception of the same signals, which are combined and input to a beamformer.

In order to perform phase calibration in a wireless reception apparatus with a diversity configuration, the calibration control portion 81 issues a calibration start instruction to the calibration signal generation portion 82, RF switch 83, calibration signal detection portion 85, and weight generation portion 86. Based on the calibration start instruction, the calibration signal generation portion 82 generates a calibration signal C. The wireless transmission portion 84 up-converts the frequency of the calibration signal and inputs the wireless signal to the RF switch 83. The RF switch 83 first transmits the calibration signal by wireless means from the antenna element A0' of the second receiving portion 201, via the circulator CIR'. All of the antenna elements A0 to A2 of the first receiving portion 200 receive the wireless calibration signal radiated from the antenna element A0', and input the signals to the wireless receiving portions $71_0$ to $71_2$. The wireless receiving portions $71_0$ to $71_2$ frequency-convert the wireless signals to baseband calibration signals, and demodulate and input the signals to the calibration signal detection portion 85. From the demodulated signals, the calibration signal detection portion 85 detect the calibration signals C0 to C2 received by the antenna elements A0 to A2, and input the signals to the weight generation portion 86. The weight generation portion 86 uses the method explained in the second embodiment to calculate weight coefficients W0 to W2 such that the phase differences of the calibration signals C0 to C2 are the phases determined from the antenna element intervals, and inputs these weight coefficients W0 to W2 to the phase shifters $72_0$ to $72_2$. The phase shifters $72_0$ to $72_2$ multiply the weight coefficients W0 to W2 by the main signals for input to the signal distributor 73. By this means, the phase differences of the calibration signals C0 to C2 at the input terminals of the signal distributor 73, and received by the antenna elements A0 to A2, are the phases determined from the antenna element intervals.

Next, the RF switch 83 wirelessly transmits a calibration signal from the antenna element A2 of the first receiving portion 200, via the circulator CIR. All of the antenna elements A0' to A2' of the second receiving portion 201 receive the wireless calibration signal radiated from the antenna element A2, and input the signals to the wireless receiving portions $71_0'$ to $71_2'$ of the second receiving portion. Subsequently, the weight coefficients W0' to W2' for the second receiving portion 201 are determined similarly to the case of the first receiving portion 200, and so by inputting the weight coefficients W0' to W2' to the phase shifters $72_0'$ to $72_2'$ of the second receiving portion 201, the phase differences of calibration signals C0' to C2' at the input terminals of the signal distributor 73', received by the antenna elements A0' to A2', become equal to the phases determined from the antenna element intervals.

According to the sixth embodiment, even in a wireless apparatus with a reception diversity configuration, the number of signals switched by the RF switch can be made two, regardless of the number of antennas, so that the RF switch cost can be decreased. Further, a configuration in which there are two receiving portions, similar to the fourth embodiment, is possible.

(G) Seventh Embodiment

Figure 9:
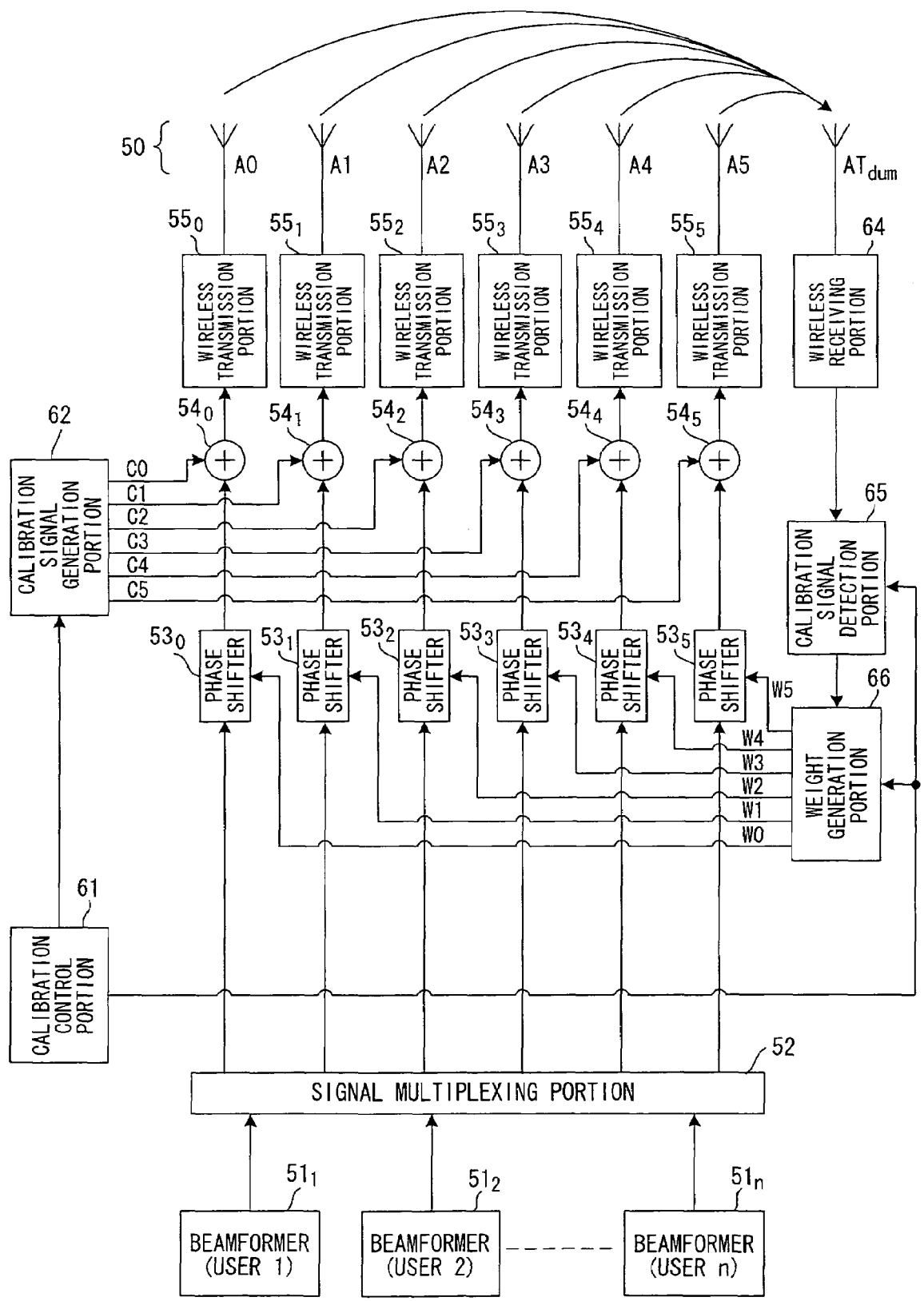
FIG. 9 shows the configuration of principal portions of a wireless transmission apparatus comprising the calibration apparatus of a seventh embodiment.

FIG. 9 shows the configuration of principal portions of a wireless transmission apparatus comprising the calibration apparatus of a seventh embodiment. Portions which are the same as in the first embodiment of FIG. 1 are assigned the same symbols. Differences are (1) elimination of the RF switch 63, and (2) provision of a dummy antenna $AT_{dum}$, which receives calibration signals radiated from all of the antenna elements A0 to A5 comprised by an array antenna, and input of the received signals to the wireless receiving portion 64.

A linear array antenna shapes a beam pattern, and so there are dummy antennas on both sides. In order to perform phase calibration in this wireless transmission apparatus, the calibration control portion 61 issues a calibration start instruction to the calibration signal generation portion 62, calibration signal detection portion 65, and weight generation portion 66. Based on the calibration start instruction, the calibration signal generation portion 62 generates calibration signals C0 to C5. The adders $54_0$ to $54_5$ combines the calibration signals C0 to C5 with the main signals of the phase shifters $53_0$ to $53_5$, and the wireless transmission portions $55_0$ to $55_5$ up-convert the frequency of the combined signals output from the adders $54_0$ to $54_5$ to the wireless frequency, and then amplify and transmit the signals from the antenna elements A0 to A5.

The dummy antenna $AT_{dum}$ electromagnetically receives the signals radiated from the antenna elements A0 to A5, and inputs the received signals to the wireless receiving portion 64. The wireless receiving portion 64 frequency-converts the received signals into baseband signals, performs demodulation and inputs the signals to the calibration signal detection portion 65. The calibration signal detection portion 65 detects, from the demodulated signals, the calibration signals C0 to C5 radiated from the antenna elements A0 to A5, and inputs the calibration signals to the weight generation portion 66. The weight generation portion 66 uses the method explained in the first embodiment to calculate weight coefficients W0 to W5 such that the phase differences of the calibration signals C0 to C5 are the phases determined from the antenna element intervals, and inputs these weight coefficients W0 to W5 to the phase shifters $53_0$ to $53_5$. The phase shifters $53_0$ to $53_5$ multiply the weight coefficients W0 to W5 by the main signals output from the signal combining portion 52. By this means, the phase differences of calibration signals C0 to C5 at the antenna elements are equal to the phases determined from antenna element intervals.

By means of the seventh embodiment, the RF switch can be eliminated, and by providing dummy antennas, weight coefficients can be calculated in a short length of time.

(H) Eighth Embodiment

Figure 10:
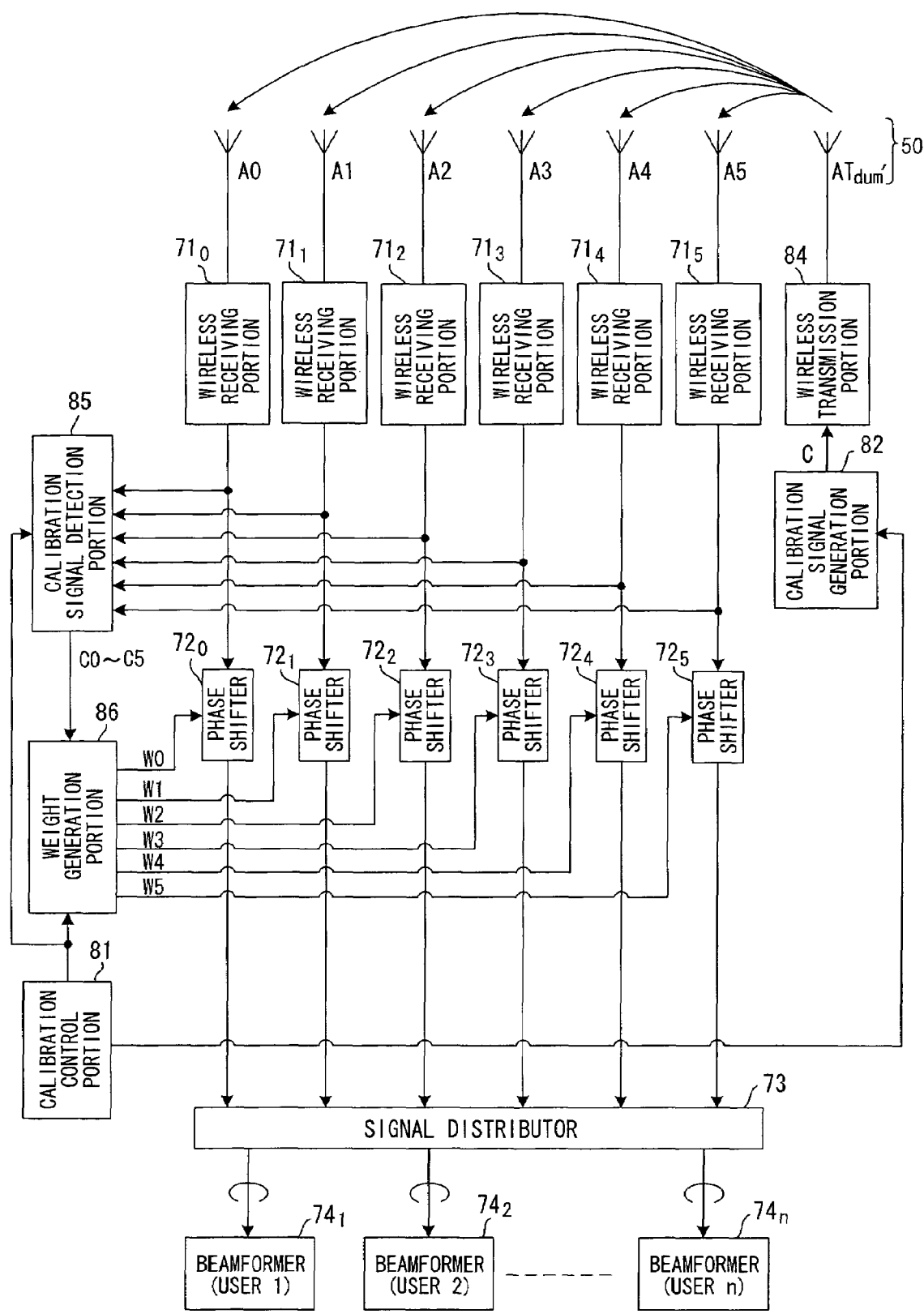
FIG. 10 shows the configuration of principal portions of a wireless transmission apparatus comprising the calibration apparatus of a eighth embodiment.

FIG. 10 shows the configuration of principal portions of a wireless transmission apparatus comprising the calibration apparatus of a eighth embodiment. Portions which are the same as in the second embodiment of FIG. 3 are assigned the same symbols. Differences are (1) the elimination of the RF switch 83, and (2) the provision of a dummy antenna $AT_{dum}'$ which transmits calibration signals to all the antenna elements A0 to A5 comprised by the array antenna.

In order to perform phase calibration in this wireless receiving apparatus, the calibration control portion 81 issues a calibration start instruction to the calibration signal generation portion 82, calibration signal detection portion 85, and weight generation portion 86. Based on the calibration start instruction, the calibration signal generation portion 82 generates a calibration signal C. The wireless transmission portion 84 up-converts the frequency of the calibration signal and transmits the wireless calibration signal from the dummy antenna element $AT_{dum}'$. The calibration signal radiated from the dummy antenna element $AT_{dum}'$ is received by all the antenna elements A0 to A5 comprised by the array antenna, and the signals are input to the wireless receiving portions $71_0$ to $71_5$. The wireless receiving portions $71_0$ to $71_5$ frequency-converts the wireless signals to baseband calibration signals, perform demodulation, and input the signals to the calibration signal detection portion 85. The calibration signal detection portion 85 detects from the demodulated signals the calibration signals C0 to C5 received by the antenna elements A0 to A5, and inputs the signals to the weight generation portion 86. The weight generation portion 86 uses the method described in the second embodiment to calculate weight coefficients W0 to W5 such that the phase differences of the calibration signals C0 to C5 are the phases determined from the antenna element intervals, and inputs the weight coefficients to the phase shifters $72_0$ to $72_5$. The phase shifters $72_0$ to $72_5$ multiply the weight coefficients W0 to W5 by the main signals for input to the signal distributor 73. By this means, the phase differences at the input terminals of the signal distributor 73 of the calibration signals C0 to C5 received by the antenna elements A0 to A5 are the phases determined from the antenna element intervals.

By means of the eighth embodiment, the RF switch can be eliminated, and by providing a dummy antenna the weight coefficients can be calculated in a short length of time.

Weight Calculation Timing

Figure 11:
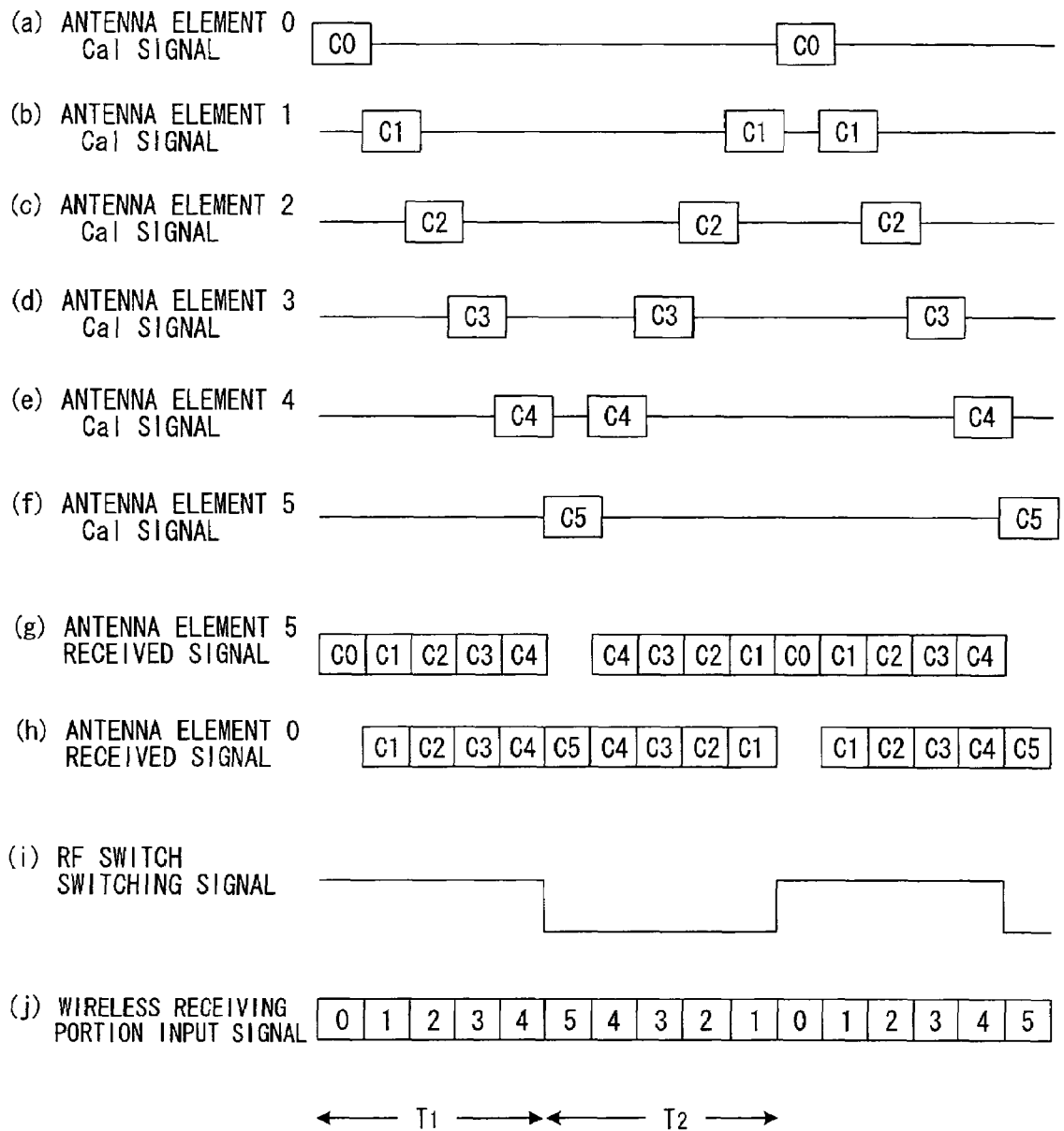
FIG. 11 explains the timing for time-division multiplexing of calibration signals.

FIG. 11 explains the timing for time-division multiplexing of calibration signals. This example is applied to FIG. 1, but similar multiplexing is possible in the other embodiments as well.

The calibration signal generation portion 62 generates calibration signals C0 to C5 and multiplexes them with the corresponding main signals in the order (a) through (f) shown in the figure. As a result, the antenna elements A5 and A0 receive the calibration signals indicated in (g) and (h). The calibration control portion 61 inputs to the RF switch 63 the RF switching signal indicated in (i), so that in the initial timing T1 slot as shown in (j), the RF switch 63 inputs to the wireless receiving portion 64 the calibration signals C0 to C4 received by the antenna element A5, and in the next timing slot T2 inputs to the wireless receiving portion 64 the calibration signals C1 to C5 received by the antenna element A0. Because the calibration signals C0 to C5 are time-division multiplexed, the calibration signal detection portion 65 can separate the signals.

Figure 12:
FIG. 12 explains the timing for code multiplexing of calibration signals.

FIG. 12 explains the timing for code multiplexing of calibration signals. This example is applied to FIG. 1, but multiplexing is similarly possible in the other embodiments also.

The calibration signal generation portion 62 performs spreading modulation using orthogonal code 0 through code 5 as shown in (a) through (f) of FIG. 12, to generate and multiplex calibration signals C0 to C5 with corresponding main signals. As a result, the antenna element A5 receives the code-multiplexed calibration signals C0 to C4 shown in (g), and the antenna element A0 receives the code-multiplexed calibration signals C1 to C5 shown in (h). The calibration control portion 61 inputs the RF switching signals shown in (i) to the RF switch 63, so that as indicated in (j) the RF switch 63 inputs to the wireless receiving portion 64 the code-multiplexed calibration signals C0 to C4 received by the antenna element A5 in the initial timing slot T1, and inputs to the wireless receiving portion 64 the code-multiplexed calibration signals C1 to C5 received by the antenna element A0 in the next timing slot T2. Because the calibration signals C0 to C5 are code-division multiplexed, the calibration signal detection portion 65 can separate the signals.

Figure 13:
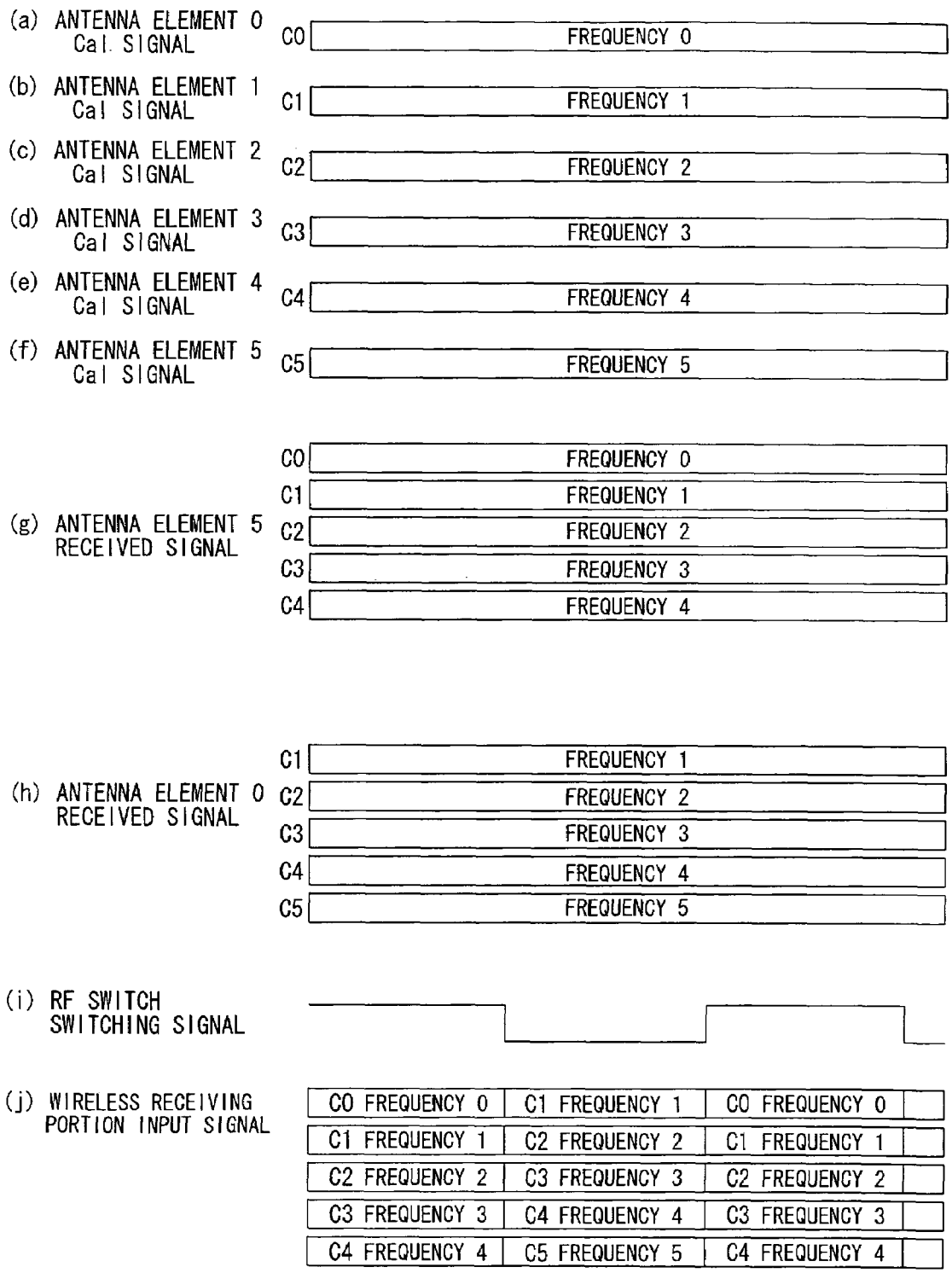
FIG. 13 explains the timing for frequency multiplexing of calibration signals; and, FIG. 14 shows the configuration of a transmission apparatus comprising calibration functions of the prior art.
Figure 14:
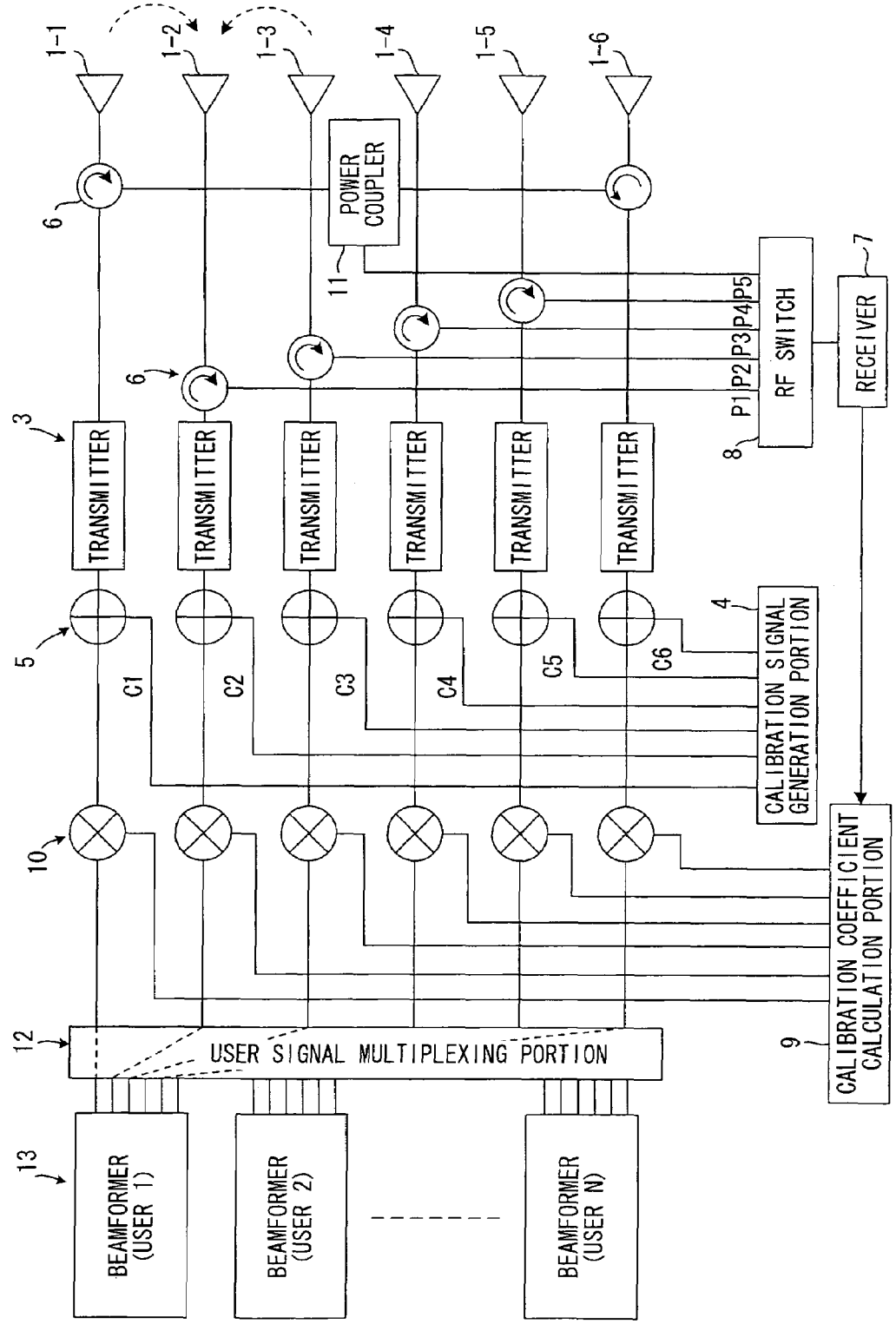

FIG. 13 explains the timing for frequency multiplexing of calibration signals. This example is applied to FIG. 1, but multiplexing is similarly possible in the other embodiments also.

The calibration signal generation portion 62 performs frequency modulation at different frequencies (from frequency o to frequency 5) to generate calibration signals C0 to C5, as shown in (a) through (f) in FIG. 13, which are multiplexed with corresponding main signals. As a result, the antenna element A5 receives the frequency-multiplexed calibration signals C0 to C4 in (g), and the antenna element A0 receives the frequency-multiplexed calibration signals C1 to C5 in (h). The calibration control portion 61 inputs the RF switching signal shown in (i) to the RF switch 63, and so as indicated in (j), the RF switch 63 inputs to the wireless receiving portion 64 the frequency-multiplexed calibration signals C0 to C4 received by antenna element A5 in the initial timing slot T1, and inputs to the wireless receiving portion 64 the frequency-multiplexed calibration signals C1 to C5 received by antenna element A0 in the next timing slot T2. Because the calibration signals C0 to C5 are frequency-multiplexed, the calibration signal detection portion 65 can separate the signals.

As many apparently widely different embodiments of the present invention can be made without departing from the spirit and scope thereof, it is to be understood that the invention is not limited to the specific embodiments thereof except as defined in the appended claims.

What is claimed is:

1. A calibration apparatus, in a wireless transmission diversity apparatus comprising first and second transmission portions which transmit the same signals and which calibrates the phases of main signals input to each of the antenna elements of the array antennas of said first and second transmission portions, comprising:
- a calibration signal generation portion for generating calibration signals;
- a first signal combining portion for combining the main signals input to each of the antenna elements of said first transmission portions with said calibration signals;
- a second signal combining portion for combining the main signals input to each of the antenna elements of said second transmission portions with said calibration signals;
- a first wireless retention portion for wirelessly receiving calibration signals radiated from all the antenna elements of the first transmission portion via a single antenna element of the second transmission portion;
- a second wireless reception portion for wirelessly receiving calibration signals radiated from all the antenna elements of the second transmission portion via a single antenna element of the first transmission portion:
- an RF switch, to which are input signals radiated from all the antenna elements of said second transmission portion via said single antenna element of said first transmission portion, to which are input signals radiated from all the antenna elements of said first transmission portion via said single antenna element of said second transmission portion, and which switches and outputs said input signals;
- a receiving portion for demodulating the signals switched by said RF switch;
- a calibration signal detection portion for detecting calibration signals from said demodulated signals;
- a weight generation portion, which uses the calibration signals detected for each antenna element to calculate a calibration weight for each antenna element to control the phase of the main signal input to each of the antenna elements of said first transmission portion and the phase of the main signal input to each of the antenna elements of said second transmission portion;
- a first phase shifter, which executes control of phase shifting of the main signals input to each of the antenna elements of said first transmission portions, based on said calculated calibration weights; and
- a second phase shifter, which executes control of phase shifting of the main signals input to each of the antenna elements of said second transmission portions, based on said calculated calibration weights.

2. A calibration apparatus, in a wireless receiving apparatus with a diversity configuration having first and second receiving portions which calibrates the phases of main signals received by each of the antenna elements of the array antennas of first and second receiving portions, comprising:
- a calibration signal generation portion for generating calibration signals;
- a first wireless transmission portion for wirelessly transmitting calibration signals from a single antenna element of the array antenna of the first receiving portion to all the antenna elements of the array antenna of the second receiving portion;
- a second wireless transmission portion for wirelessly transmitting calibration signals from a single antenna element of the array antenna of the second receiving portion to all the antenna elements of the array antenna of the first receiving portion;
- an RF switch, which switches and inputs the calibration signals to said single antenna element of the first receiving portion and said single antenna element of the second receiving portion;
- a wireless receiver provided for each antenna elements of the first and second receiving portion, to which the signals received by each of the antenna elements are input;
- a calibration signal detection portion for detecting the calibration signal from the received signals of each wireless receiver;
- a weight generation portion for calculating calibration weights in order to control the phases of the main signals received by each antenna element of the first receiving portion and calculating calibration weights in order to control the phases of the main signals received by each antenna element of the second receiving portion, using the detected calibration signals;
- a first phase shifter, which executes phase-shifting control of the main signals received by the antenna elements of the first receiving portions, based on said calculated calibration weights; and
- a second phase shifter, which executes phase-shifting control of the main signals received by the antenna elements of the receiving portions, based on said calculated calibration weights.

* * * * *